US012542847B2

(12) United States Patent
Huang et al.

(10) Patent No.: US 12,542,847 B2
(45) Date of Patent: Feb. 3, 2026

(54) ALWAYS ON DISPLAY CONTROL METHOD AND ELECTRONIC DEVICE

(71) Applicant: Honor Device Co., Ltd., Guangdong (CN)

(72) Inventors: Liwei Huang, Shenzhen (CN); Wenjie Chen, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 349 days.

(21) Appl. No.: 18/268,849

(22) PCT Filed: Apr. 28, 2022

(86) PCT No.: PCT/CN2022/089928
§ 371 (c)(1),
(2) Date: Jun. 21, 2023

(87) PCT Pub. No.: WO2023/024559
PCT Pub. Date: Mar. 2, 2023

(65) Prior Publication Data
US 2024/0098174 A1    Mar. 21, 2024

(30) Foreign Application Priority Data

Aug. 25, 2021  (CN) .......................... 202110982092.8

(51) Int. Cl.
*H04M 1/00* (2006.01)
*G06F 9/451* (2018.01)
(Continued)

(52) U.S. Cl.
CPC ........ *H04M 1/72454* (2021.01); *G06F 9/451* (2018.02); *H04M 1/72457* (2021.01)

(58) Field of Classification Search
CPC .......... H04M 1/72454; H04M 1/72457; G06F 9/451; G06F 455/418
See application file for complete search history.

(56) References Cited

U.S. PATENT DOCUMENTS

2015/0294627 A1    10/2015  Yoo et al.
2018/0240260 A1*  8/2018  Lee .......................... G06T 11/60
(Continued)

FOREIGN PATENT DOCUMENTS

CN          106534515 A      3/2017
CN          109493793 A      3/2019
(Continued)

*Primary Examiner* — Khai M Nguyen

(57) ABSTRACT

This application provides an always on display control method and an electronic device, which relate to the field of communication technologies. Through the solutions, a plurality of layers may be preset. Each layer corresponds to a type of information, and may change according to different information trigger factors. The plurality of layers may be dynamically superimposed and combined according to different scenes, and therefore, may be combined into an AOD screen-off image that changes dynamically. In a case that the electronic device is in a screen-off state, the electronic device may display the screen-off image that includes various information such as a time, a date, a notification message, an incoming call reminder message, a power identifier, a user behavior, and weather on a screen, and the screen-off image may be dynamically updated as the scene changes.

17 Claims, 17 Drawing Sheets

(51) Int. Cl.
*H04M 1/72454* (2021.01)
*H04M 1/72457* (2021.01)

(56) References Cited

U.S. PATENT DOCUMENTS

| | | | |
|---|---|---|---|
| 2019/0066633 A1 | 2/2019 | Zhu | |
| 2021/0181923 A1 | 6/2021 | Luo et al. | |
| 2022/0208064 A1* | 6/2022 | Huang | G09G 3/2003 |
| 2023/0251814 A1* | 8/2023 | Zhang | G06F 3/0484 |
| | | | 345/173 |

FOREIGN PATENT DOCUMENTS

| | | | | |
|---|---|---|---|---|
| CN | 110149442 A | | 8/2019 | |
| CN | 111831152 A | | 10/2020 | |
| CN | 112783392 A | | 5/2021 | |
| CN | 113824834 A | | 12/2021 | |
| CN | 113973153 A | * | 1/2022 | ........ H04M 1/72451 |
| CN | 114449096 A | * | 5/2022 | ........ H04W 52/0254 |
| JP | 2023081784 A | * | 6/2023 | |
| WO | 2021143794 A1 | | 7/2021 | |

\* cited by examiner

ALWAYS ON DISPLAY CONTROL METHOD AND ELECTRONIC DEVICE

CROSS-REFERENCE TO RELATED APPLICATIONS

This application is a national stage of International Application No. PCT/CN2022/089928, filed on Apr. 28, 2022, which claims priority to Chinese Patent Application No. 202110982092.8, filed on Aug. 25, 2021. The disclosures of both of the aforementioned applications are hereby incorporated by reference in their entireties.

TECHNICAL FIELD

This application relates to the field of communication technologies, and in particular, to an always on display control method and an electronic device.

BACKGROUND

With the rapid development of electronic technologies, electronic devices such as smart phones and tablet computers are provided with more and more functions, and have become indispensable tools in people's lives and work. Taking a mobile phone as an example, a user often lights up a screen of the mobile phone to view information such as a time and a notification. Based on this, an always on display (always on display, AOD) function of an electronic device emerges as the times require.

An implementation principle of the AOD function is as follows: In a case that the electronic device is in a screen-off state, some pixels of a screen may be lit up to display information such as a clock, a date, and a notification, while other pixels of the screen are always in an off state. For example, the pixels in the off state are presented in black, so that the user can conveniently view the foregoing information without lighting up the entire screen of the electronic device, thereby lowering power consumption of the electronic device. Currently, after the always on display function is enabled on the electronic device, a representation form of an always on display pattern of the electronic device in the screen-off state is monotonous and needs to be improved.

SUMMARY

This application provides an always on display control method and an electronic device, to resolve a problem in the prior art that a representation form of an always on display pattern of an electronic device in a screen-off state is monotonous.

To achieve the foregoing objective, the following technical solutions are used in this application:

According to a first aspect, this application provides an always on display control method, including:
displaying, by an electronic device, a screen-off image in a case that the electronic device is in a screen-off state, where the screen-off image includes a plurality of layers, and the plurality of layers include different display elements; and
updating and displaying, by the electronic device, a display element on a first layer in the screen-off image in a case that the electronic device meets a preset condition, where the display element on the first layer includes a foreground window, and the preset condition includes that: the electronic device detects that user positioning information changes, or the electronic device receives a first operation performed by a user on the screen-off image; or
updating and displaying, by the electronic device, a display element on a second layer in the screen-off image in a case that the electronic device detects that user behavior information changes, where the display element on the second layer includes a scene pattern; or
updating and displaying, by the electronic device, a display element on a third layer in the screen-off image in a case that the electronic device detects that time and meteorological information changes, where the display element on the third layer includes a background pattern.

Through this solution, a plurality of layers may be preset. Each layer corresponds to a type of information, and may change according to different information trigger factors. The plurality of layers may be dynamically superimposed and combined according to different scenes, and therefore, the plurality of layers may be combined into an AOD screen-off image that changes dynamically. In a case that the electronic device is in the screen-off state, the electronic device may display the screen-off image that includes various information such as a time, a date, a notification message, an incoming call reminder message, a power identifier, a user behavior, and weather on a screen, and the screen-off image may be dynamically updated as the scene changes. Compared with an always on display effect in the prior art of usually displaying a fixed picture or a segment of an animation, through this solution of this application, the pattern displayed during screen off may dynamically change with different scenes, which improves the always on display effect.

In a possible implementation, the user positioning information includes: at home, in a company, or on a trip.

In a possible implementation, the user behavior information includes: an entertainment state, a learning state, and/or a sports state.

In a possible implementation, the time and meteorological information includes: a time in the morning/at noon/in the evening, a season, and/or weather.

In a possible implementation, the method further includes:
acquiring, by the electronic device, M types of information;
determining, by the electronic device, a display element corresponding to each type of information according to each type of information in the M types of information;
generating, by the electronic device, M layers having different display elements according to the display elements respectively corresponding to the M types of information; and
superimposing, by the electronic device, the M layers having different display elements, to obtain the screen-off image.

Further, in a case that the electronic device is in the screen-off state, the electronic device displays the screen-off image.

In a possible implementation, the electronic device acquires the M types of information in real time or periodically after enabling an always on display function.

In a possible implementation, in a case that M is 3, the M types of information includes the user positioning information, the user behavior information, and the time and meteorological information, where the display element corresponding to the user positioning information is the foreground window, and the corresponding foreground window changes with the user positioning information;

the display element corresponding to the user behavior information is the scene pattern, and the corresponding scene pattern changes with the user behavior information; and the display element corresponding to the time and meteorological information is the background pattern, and the corresponding background pattern changes with the time and meteorological information.

In a possible implementation, where the generating, by the electronic device, M layers having different display elements according to the display elements respectively corresponding to the M types of information includes:

using, by the electronic device, a layer having the foreground window corresponding to the user positioning information as a first layer;

using, by the electronic device, a layer having the scene pattern corresponding to the user behavior information as a second layer; and using, by the electronic device, a layer having the background pattern corresponding to the time and meteorological information as a third layer, where the M layers include the first layer, the second layer, and the third layer.

In a possible implementation, the method further includes:

further displaying, by the electronic device, at least one of a time, a date, a notification message, an incoming call reminder message, and a power identifier in a case that the electronic device is in the screen-off state.

In a possible implementation, where the displaying, by an electronic device, a screen-off image includes:

superimposing and displaying, by the electronic device, the plurality of layers in the screen-off image in a preset layer superposition sequence.

The preset layer superposition sequence may be that the first layer is on the uppermost layer, the second layer is between the first layer and the third layer, and the third layer is on the bottom layer.

In a possible implementation, the method further includes:

updating, by the electronic device, the layer superposition sequence in response to a second operation by the user; or periodically updating, by the electronic device, the layer superposition sequence.

In a possible implementation, where the updating and displaying, by the electronic device, a display element on a first layer in the screen-off image in a case that the electronic device meets a first preset condition, where the display element on the first layer includes a foreground window includes:

switching, by the electronic device, the foreground window on the first layer in the screen-off image from an off state to an on state in response to the first operation performed by the user on the screen-off image; or switching, by the electronic device, the foreground window on the first layer in the screen-off image from an on state to an off state in response to the first operation performed by the user on the screen-off image; or displaying, by the electronic device, a louver effect on the foreground window on the first layer in the screen-off image in response to the first operation performed by the user on the screen-off image.

Exemplarily, in a case that the electronic device during screen off displays the screen-off image, the electronic device displays the louver effect on a part or all of the foreground window in response to a fifth operation of swiping on the screen-off image along a preset direction by the user.

In a possible implementation, the method further includes:

updating and displaying, by the electronic device, the scene pattern on the second layer in a case that the foreground window on the first layer in the screen-off image is switched from the off state to the on state.

In a possible implementation, where before the updating and displaying, by the electronic device, a display element on a first layer in the screen-off image, the method further includes:

determining, by the electronic device, a foreground window corresponding to the user positioning information according to the user positioning information and a first preset relationship, where the first preset relationship is a preset correspondence between the user positioning information and a foreground window in a specific shape or size.

In a possible implementation, where before the updating and displaying, by the electronic device, a display element on a second layer in the screen-off image, the method further includes:

determining, by the electronic device, the scene pattern corresponding to the user behavior information according to the user behavior information and a second preset relationship, where the second preset relationship is a preset correspondence between the user behavior information and a scene pattern with specific content.

In a possible implementation, the method further includes:

determining, by the electronic device according to an application that is running on the electronic device, behavior information that the user acts on the electronic device as the user behavior information.

In a possible implementation, where the determining, by the electronic device according to an application that is running on the electronic device, behavior information that the user acts on the electronic device as the user behavior information includes:

acquiring, by the electronic device, user sports data according to the application that is running on the electronic device; and determining, by the electronic device, that the user behavior information includes the sports state in a case that the electronic device determines that the user sports data meets a preset sports condition, where the user sports data includes a heart rate value of the user and/or a quantity of steps of the user within a preset duration.

In a possible implementation, where before the updating and displaying, by the electronic device, a display element on a third layer in the screen-off image, the method further includes:

determining, by the electronic device, the background pattern corresponding to the time and meteorological information according to the time and meteorological information and a third preset relationship, where the third preset relationship is a preset correspondence between the time and meteorological information and a background pattern with a specific pattern, color and/or specific brightness.

In a possible implementation, where the displaying, by an electronic device, a screen-off image includes:

displaying, by the electronic device, the screen-off image in a first always on display mode, where
    the first always on display mode includes any of the following: a tap to display mode, a timing display mode, or an all-day display mode.

In a possible implementation, the method further includes:

setting, by the electronic device, an always on display mode to be the first always on display mode in response to a third operation by the user.

In a possible implementation, where before the displaying, by an electronic device, a screen-off image in a case that the electronic device is in a screen-off state, the method further includes:

enabling, by the electronic device, the always on display function in response to a fourth operation by the user.

In a possible implementation, the method further includes:

displaying, by the electronic device, a setting interface of the always on display function in response to a fifth operation by the user, where the setting interface includes a preset gallery; and
    using, by the electronic device in response to a sixth operation of selecting an image from the preset gallery by the user, the selected image as a display element on a target layer in the screen-off image, where
    the target layer may be one of the plurality of layers in the screen-off image. The preset gallery may include an image stored locally in the electronic device and/or an image stored in a network server.

According to a second aspect, this application provides an always on display control apparatus, including units configured to perform the method according to the first aspect. The apparatus may correspondingly perform the method described in the first aspect. For relevant description of the units in the apparatus, reference may be made to the description of the first aspect. For brevity, details are not described herein again.

The method described in the first aspect may be implemented by using hardware or may be implemented by using hardware executing corresponding software. The hardware or the software includes one or more modules or units corresponding to the foregoing functions, for example, a processing module or unit and a display module or unit.

According to a third aspect, this application provides an electronic device, including a processor, where the processor is coupled to a memory, the memory is configured to store a computer program or instructions, and the processor is configured to execute the computer program or instructions stored in the memory, to cause the method according to the first aspect to be performed.

For example, the processor is configured to execute the computer program or instructions stored in the memory, to cause the apparatus to perform the method according to the first aspect.

According to a fourth aspect, this application provides a computer-readable storage medium storing a computer program (which may also be referred to as instructions or code) configured to implement the method according to the first aspect.

For example, the computer program, when executed by a computer, causes the computer to perform the method according to the first aspect.

According to a fifth aspect, this application provides a chip, including a processor. The processor is configured to read and execute a computer program stored in a memory, to perform the method according to the first aspect and any possible implementation of the first aspect.

Optionally, the chip further includes the memory, and the memory is connected to the processor through a circuit or a wire.

According to a sixth aspect, this application provides a system-on-chip, including a processor. The processor is configured to read and execute a computer program stored in a memory, to perform the method according to the first aspect and any possible implementation of the first aspect.

Optionally, the system-on-chip further includes a memory, where the memory is connected to the processor through a circuit or a wire.

According to a seventh aspect, this application provides a computer program product, including a computer program (which may also be referred to as instructions or code), the computer program, when executed by a computer, causing the computer to implement the method according to the first aspect.

It may be understood that, for beneficial effects of the second aspect to the seventh aspect, reference may be made to the relevant description in the first aspect, and details are not described herein again.

DESCRIPTION OF EMBODIMENTS

In order to make objectives, technical solutions, and advantages of embodiments of this application clearer, the technical solutions in the embodiments of this application will be clearly and completely described below with reference to the accompanying drawings in the embodiments of this application. It is clear that the embodiments to be described are only a part rather than all of the embodiments of this application. All other embodiments obtained by a person of ordinary skill in the art based on the embodiments of this application without creative efforts shall fall within the protection scope of this application.

The term "and/or" used herein describes only an association relationship for describing associated objects and represents that three relationships may exist. For example, A and/or B may represent the following three cases: Only A exists, both A and B exist, and only B exists. The symbol "/" in this specification represents an "or" relationship between associated objects. For example, "A/B" means A or B.

In the specification and claims herein, the terms such as "first" and "second" are intended to distinguish between different objects, but do not indicate a particular order of the objects. For example, a first operation, a second operation, and the like are intended to distinguish between different operations but do not indicate a particular order of the operations.

In the embodiments of this application, the term "exemplarily" or "for example" is used to represent giving an example, an illustration, or a description. Any embodiment or design solution described by using "exemplarily" or "for example" in the embodiments of this application should not be explained as being more preferred or having more advantages than another embodiment or design solution. Exactly, the terms such as "exemplarily" or "for example" are intended to present a related concept in a specific manner.

In the description of the embodiments of this application, unless otherwise stated, "a plurality of" means two or more. For example, a plurality of processing units mean two or more processing units, and a plurality of elements mean two or more elements.

Figure 1:
FIG. 1 is a schematic diagram of an always on display effect according to an embodiment of this application.

FIG. 1 is a schematic diagram of an always on display effect after a current electronic device enables an always on display function. As shown in FIG. 1, after an electronic device 1 (for example, a mobile phone) enables an always on display function, in a case that the electronic device is in a screen-off state, some pixels of a screen is lit up to display information such as a clock, a date, and a notification, which is convenient for a user to view the foregoing information, and can reduce power consumption of the electronic device. Currently, in the industry, an existing always on display pattern is usually a fixed picture or a segment of an animation. Therefore, a representation form of the always on display pattern of the electronic device in the screen-off state is monotonous and needs to be improved.

In view of this, through an always on display control method and an electronic device provided in the embodiments of this application, a plurality of layers may be preset. Each layer corresponds to a type of information, and may change according to different information trigger factors. The plurality of layers may be dynamically superimposed and combined according to different scenes, and therefore, the plurality of layers may be combined into an AOD screen-off image that changes dynamically. In a case that the electronic device is in the screen-off state, the electronic device may display the screen-off image that includes various information such as a time, a date, a notification message, an incoming call reminder message, a power identifier, a user behavior, and weather on a screen, and the screen-off image may be dynamically updated as the scene changes. Compared with an always on display effect in the prior art of usually displaying a fixed picture or a segment of an animation, through this solution of this application, the pattern displayed during screen off may dynamically change with different scenes, which improves the always on display effect.

It should be noted that the electronic device described in this application is an electronic device with a display screen, and may be a smart terminal such as a mobile phone, a tablet computer, or a smart watch. The electronic device is not specifically limited herein. For ease of description, an example in which the electronic device is a mobile phone is used in the following embodiments.

The electronic device in the embodiments of this application may be a mobile terminal, or may be a non-mobile terminal. For example, the mobile terminal may be a mobile phone, a tablet computer, a notebook computer, a palmtop computer, an in-vehicle terminal, a wearable device, an ultra-mobile personal computer (ultra-mobile personal computer, UMPC), a netbook, a personal digital assistant (personal digital assistant, PDA), or the like, and the non-mobile terminal may be a personal computer (personal computer, PC), a television (television, TV), a teller machine, a self-service machine, or the like. This is not specifically limited in the embodiments of this application.

An execution entity of the always on display control method provided in the embodiments of this application may be the foregoing electronic device, or may be a functional module and/or a functional entity in the electronic device that is capable of implementing the always on display control method. In addition, the solutions of this application may be implemented in a hardware and/or software manner. The specific manner may be determined according to an actual usage requirement and this is not limited in the embodiments of this application. By using the electronic device as an example, the always on display control method provided in the embodiments of this application is exemplarily described below with reference to the accompanying drawings.

Figure 2:
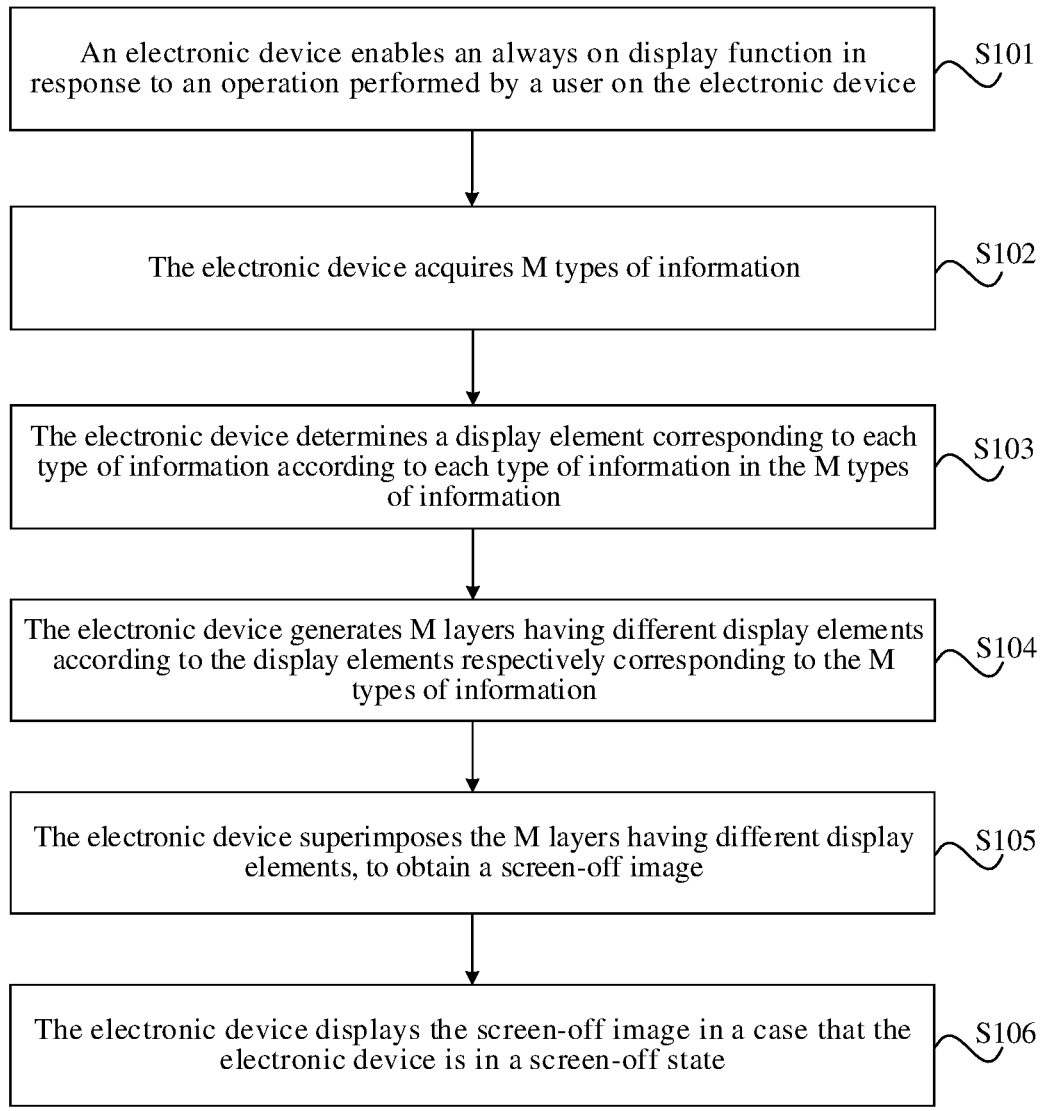
FIG. 2 is a schematic flowchart of an always on display control method according to an embodiment of this application.

FIG. 2 is a schematic flowchart of an always on display control method according to an embodiment of this application. As shown in FIG. 2, the method includes the following steps S101 to S106.

S101. An electronic device enables an always on display function in response to an operation performed by a user on the electronic device.

S102. The electronic device acquires M types of information.

Optionally, the electronic device may acquire the M types of information in real time or periodically after enabling the always on display function. M may be an integer greater than 1.

Exemplarily, assuming that M is 3, the M types of information may include the following three types of information: user positioning information, user behavior information, and time and meteorological information.

Optionally, the user positioning information may include: at home, in a company, or on a trip. Optionally, the electronic device may determine the user positioning information by acquiring position information of the electronic device by using a navigation application.

Optionally, the time and meteorological information may include: a time in the morning/at noon/in the evening, a season, and/or weather. Optionally, the electronic device may acquire, by using a weather application, season and weather conditions of a region in which the electronic device is located. Optionally, the electronic device may acquire, by using a clock application, a time in the morning/at noon/in the evening of the region in which the electronic device is located.

Optionally, the user behavior information may include: an entertainment state, a learning state, and/or a sports state. The electronic device may determine, according to an application that is running on the electronic device, behavior information that the user acts on the electronic device, to obtain the user behavior information.

Exemplarily, in a case that the electronic device detects that a video application, a music application, or a game application is running, the electronic device may determine that the user behavior information includes the entertainment state.

Exemplarily, in a case that the electronic device detects that a teaching application is running, the electronic device may determine that the user behavior information includes the learning state.

Exemplarily, the electronic device may acquire user sports data according to a sports application that is running on the electronic device. For example, the user sports data may include a heart rate value of the user, and/or a quantity of steps of the user within a preset duration. Further, in a case that the electronic device determines that the user sports data meets a preset sports condition, for example, in a case that the heart rate value detected by the electronic device is greater than or equal to a preset heart rate threshold, the electronic device determines that the user is in the sports state, that is, the user behavior information includes the sports state.

It should be noted that the foregoing M types of information is listed as examples. During actual implementation, the M types of information may further include any other information that meets an actual usage requirement. It may be understood that the user positioning information, the user behavior information, and the time and meteorological information are listed as examples, and other information may be further included during actual implementation. Information specifically included may be determined according to an actual usage requirement, and this is not limited in this embodiment of this application.

S103. The electronic device determines a display element corresponding to each type of information according to each type of information in the M types of information.

For ease of description, exemplary descriptions are made below by using an example in which the M types of information include the user positioning information, the user behavior information, and the time and meteorological information.

(1). User Positioning Information

Optionally, in this embodiment of this application, the display element corresponding to the user positioning information may be a foreground window.

A correspondence between the user positioning information and a foreground window in a specific shape or size may be preset, and the correspondence is referred to as a first preset relationship below.

It may be understood that the corresponding foreground window changes with the user positioning information. Exemplarily, as shown in (a1), (a2), and (a3) in FIG. 3, for the foreground window, foreground windows in various shapes and sizes such as an airplane window, a circular window, and an oval window may be preset.

Exemplarily, after acquiring the user positioning information, the electronic device may determine the foreground window corresponding to the user positioning information according to the first preset relationship.

During actual implementation, in terms of a display effect, attributes such as the shape and/or the size of the foreground window during always on display may change with the user positioning information.

(2). User Behavior Information

Optionally, in this embodiment of this application, the display element corresponding to the user behavior information may be a scene pattern.

A correspondence between the user behavior information and a scene pattern with specific content may be preset, and the correspondence is referred to as a second preset relationship below.

It may be understood that the corresponding scene pattern changes with the user behavior information. Exemplarily, as shown in (b1), (b2), and (b3) in FIG. 3, in terms of the scene pattern, different scene patterns such as a dynamic musical note pattern, a sports pattern, and a dynamic heartbeat pattern may be preset.

Exemplarily, after acquiring the user behavior information, the electronic device may determine the scene pattern corresponding to the user behavior information according to the second preset relationship.

During actual implementation, in terms of the display effect, the content of the scene pattern during the always on display may change with the behavior information that the user acts on the electronic device.

(3). Time and Meteorological Information

Optionally, in this embodiment of this application, the display element corresponding to the time and meteorological information may be a background pattern.

A correspondence between the time and meteorological information and a background pattern with a specific pattern, color, and/or specific brightness may be preset, and the correspondence is referred to as the second preset relationship below.

It may be understood that the corresponding background pattern changes with the time and meteorological information. Exemplarily, as shown in (c1), (c2), and (c3) in FIG. 3, in terms of the background pattern, a static pattern background with the sun on bright sky, a static pattern background with dark sky, a dynamic pattern background with rainy sky and a night effect, and the like may be preset.

Exemplarily, after acquiring the time and meteorological information, the electronic device may determine the background pattern corresponding to the time and meteorological information according to the third preset relationship.

During actual implementation, in terms of the display effect, a pattern feature, a color, and/or brightness of the background pattern during the always on display may change with the time and meteorological information.

S104. The electronic device generates M layers having different display elements according to the display elements respectively corresponding to the M types of information.

For ease of description, exemplary descriptions are made below by using an example in which the M layers include a layer 1, a layer 2, and a layer 3.

(1). Layer 1

After the electronic device determines the foreground window corresponding to the user positioning information, the electronic device may use a layer having the foreground window as the layer 1.

Figure 3:
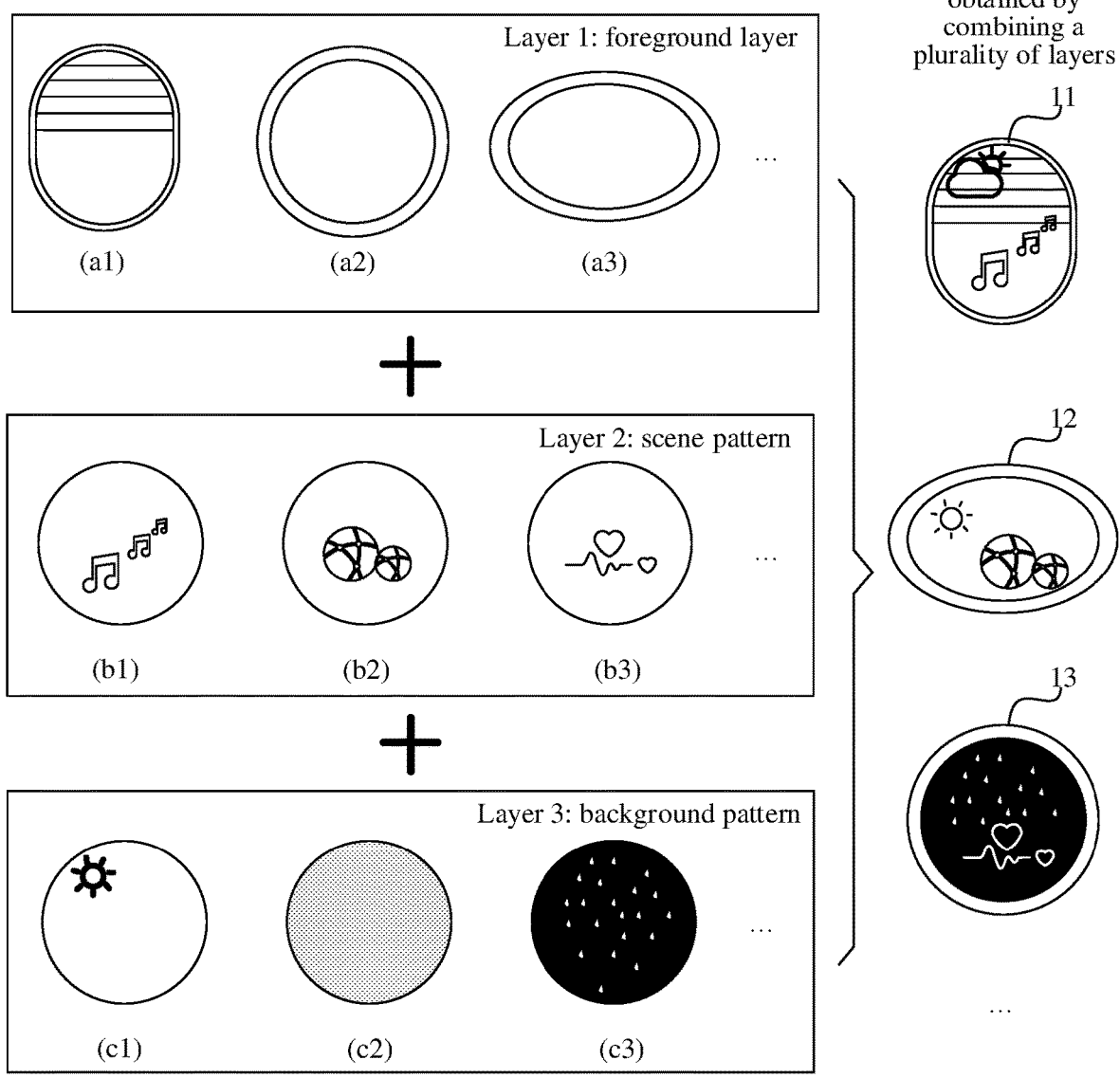
FIG. 3 is a schematic diagram of a combination of different layers in an always on display control method according to an embodiment of this application.

For example, as shown in (a1) in FIG. 3, in a case that the user positioning information indicates being at home, the circular window as shown in (a2) in FIG. 3 may be presented on the layer 1.

For example, in a case that the user positioning information indicates being in a company, the oval window as shown in (a3) in FIG. 3 may be presented on the layer 1.

For example, in a case that the user positioning information indicates being on a trip, the airplane window as shown in (a1) in FIG. 3 may be presented on the layer 1.

(2). Layer 2

After the electronic device determines the scene pattern corresponding to the user behavior information, the electronic device may use a layer having the scene pattern as the layer 2.

For example, in a case that the user behavior information indicates being in the entertainment state, a corresponding entertainment scene pattern such as a dynamic video pattern, a game pattern, or the dynamic musical note pattern as shown in (b1) in FIG. 3 may be presented on the layer 2.

For example, in a case that the user behavior information indicates being in the learning state, a corresponding learning scene pattern such as a book cover may be presented on the layer 2.

For example, in a case that the user behavior information indicates being in the sports state, a corresponding sports scene pattern such as the sports pattern as shown in (b2) in FIG. 3 may be presented on the layer 2.

(3). Layer 3

After the electronic device determines the background pattern corresponding to the time and meteorological information, the electronic device may use a layer having the background pattern as the layer 3.

For example, with the sky as the background, in a case that the time and meteorological information indicates being in the morning and being a sunny day, a static pattern with the sun on the bright sky as shown in (c1) in FIG. 3 may be presented on the layer 3.

For another example, in a case that the time and meteorological information indicates being at noon and being a cloudy day, a static pattern with dark clouds on gray sky as shown in (c2) in FIG. 3 may be presented on the layer 3.

For another example, in a case that the time and meteorological information indicates being in the evening and being a rainy day, a dynamic pattern with rainy sky and a night effect as shown in (c3) in FIG. 3 may be presented on the layer 3.

It should be noted that an example in which there are three layers is used herein for exemplary descriptions. During actual implementation, the M layers may include more than three layers. Layers specifically included may be determined according to an actual usage requirement, and this is not limited in this embodiment of this application.

S105. The electronic device superimposes the M layers having different display elements, to obtain a screen-off image.

Still referring to FIG. 3, which shows various foreground windows on the layer 1, various scene patterns on the layer 2, and various background patterns on the layer 3. The three layers may be dynamically superimposed and combined according to different scenes, to obtain a screen-off image that changes dynamically, such as a screen-off image 11, a screen-off image 12, or a screen-off image 13.

Optionally, the electronic device may superimpose the M layers having different display elements in a preset layer superposition sequence, to obtain the screen-off image.

Exemplarily, the preset layer superposition sequence may be that the layer 1 is on the uppermost layer, the layer 2 is between the layer 1 and the layer 3, and the layer 3 is on the bottom layer.

Optionally, the electronic device may update the layer superposition sequence in response to a trigger operation by the user. Alternatively, the electronic device may periodically update the layer superposition sequence.

In this embodiment of this application, in addition to a fixed superimposition sequence, a sequence in which a plurality of layers are superimposed may be dynamically adjusted according scenes, to improve diversity of the always on display.

Figure 4:
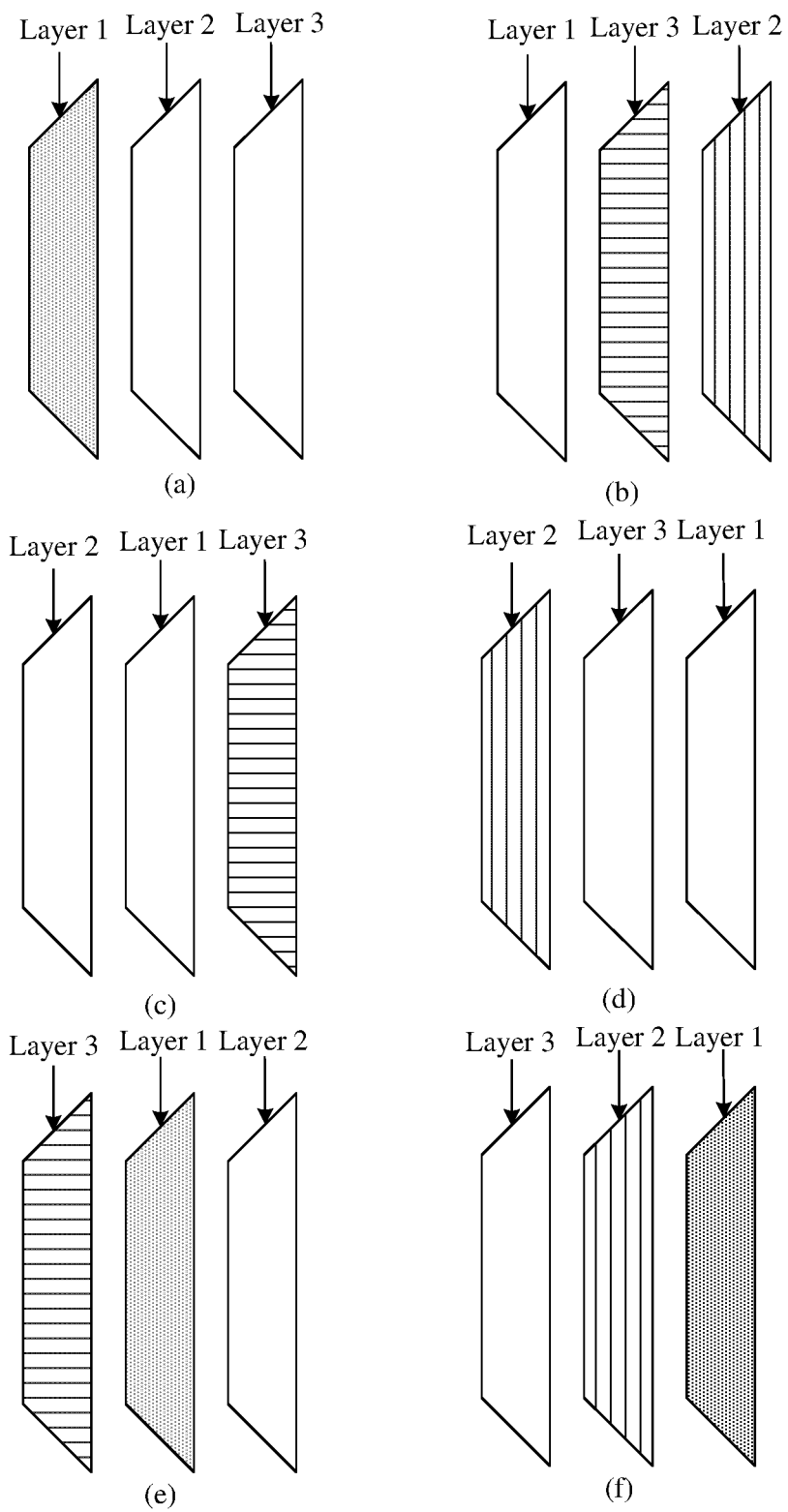
FIG. 4 is a schematic diagram in which different layers are superimposed in different sequences in an always on display control method according to an embodiment of this application.

FIG. 4 schematically shows various possible manners in which the layer 1, the layer 2, and the layer 3 are superimposed in different layer superposition sequences. As shown in (a) in FIG. 4, the layer superposition sequence is the layer 1 first, then the layer 2, and finally the layer 3. As shown in (b) in FIG. 4, the layer superposition sequence is the layer 1 first, then the layer 3, and finally the layer 2. As shown in (c) in FIG. 4, the layer superposition sequence is the layer 2 first, then the layer 1, and finally the layer 3. As shown in (d) in FIG. 4, the layer superposition sequence is the layer 2 first, then the layer 3, and finally the layer 1. As shown in (e) in FIG. 4, the layer superposition sequence is the layer 3 first, then the layer 1, and finally the layer 2. As shown in (f) in FIG. 4, the layer superposition sequence is the layer 3 first, then the layer 2, and finally the layer 1.

It should be noted that, in this embodiment of this application, the screen-off image may be a static image, or may be a dynamic image, which may be specifically determined according to the display elements on the layers. It may be understood that in a case that the display element on any layer is a dynamic pattern, the screen-off image is presented as a dynamic image.

S106. The electronic device displays the screen-off image in a case that the electronic device is in a screen-off state.

Optionally, the electronic device may continuously display the screen-off image when being in a screen-off state. In this case, some pixels of a screen are lit up, and the other pixels are in an off state.

Optionally, after the screen-off image is displayed for a preset duration, in a case that the electronic device does not receive the trigger operation by the user, the electronic device may no longer display the screen-off image. In this case, all pixels of the full screen are in the off state.

Through the always on display control method provided in this embodiment of this application, a plurality of layers may be preset. Each layer corresponds to a type of information, and may change according to different information trigger factors. The plurality of layers may be dynamically superimposed and combined according to different scenes, and therefore, may be combined into an AOD screen-off image that changes dynamically. In a case that the electronic device is in the screen-off state, the electronic device may display the screen-off image that includes various information such as a time, a date, a notification message, an incoming call reminder message, a power identifier, a user behavior, and weather on a screen, and the screen-off image may be dynamically updated as the scene changes. Compared with an always on display effect of usually displaying a fixed picture or a segment of an animation in the prior art, through this solution of this application, a pattern displayed during screen off may dynamically change with different scenes, which improves the always on display effect.

Optionally, in this embodiment of this application, the electronic device may further display at least one of a time, a date, a notification message, an incoming call reminder message, and a power identifier in a case that the electronic device is in the screen-off state. Such information may be carried on another layer, which is referred to as an information layer. Optionally, the information layer may be superimposed with the foregoing layer 1, layer 2, and layer 3, to obtain a screen-off image.

Figure 5:
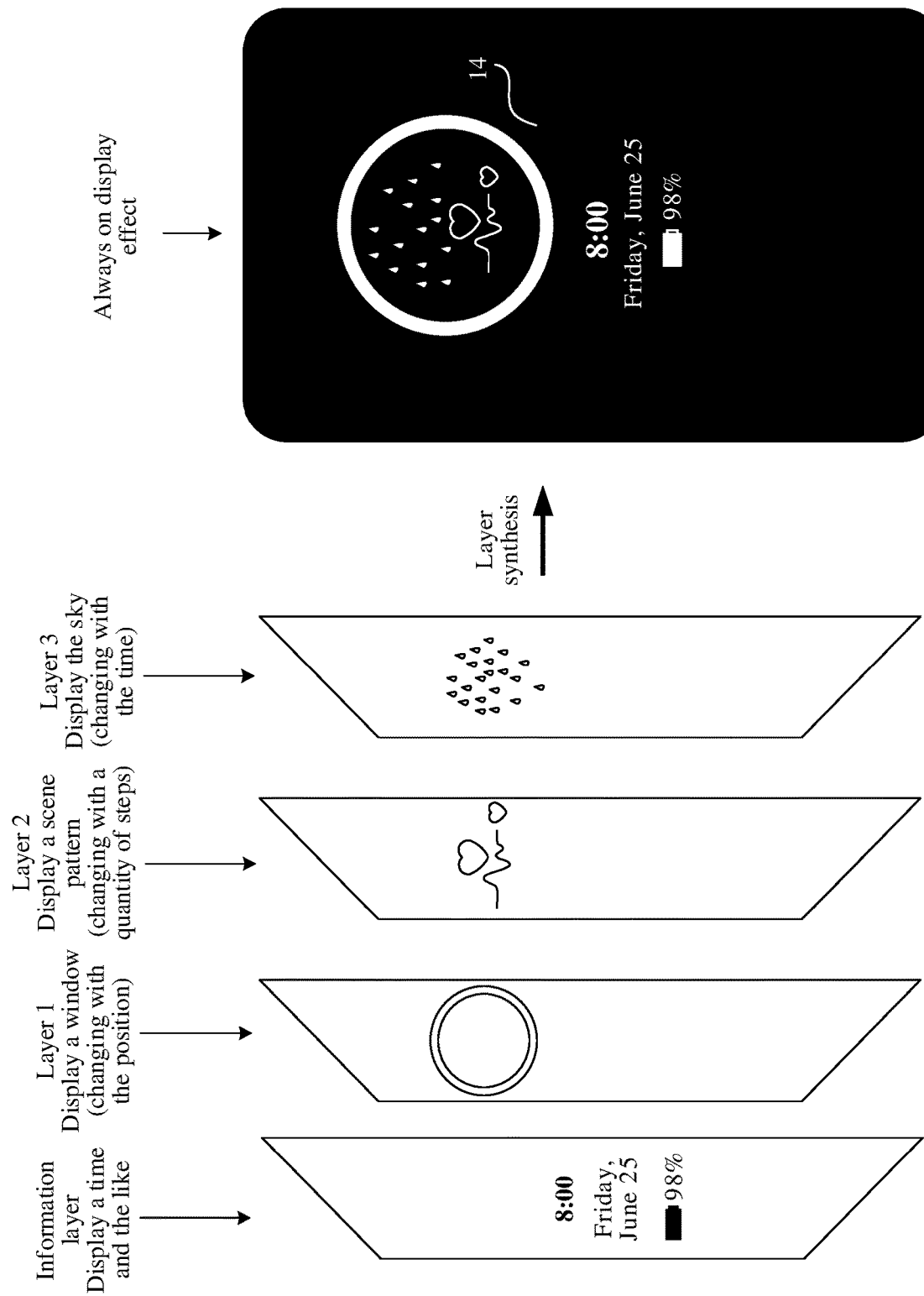
FIG. 5 is a schematic diagram in which different layers are superimposed and combined in a preset sequence in an always on display control method according to an embodiment of this application.

FIG. 5 exemplarily shows a schematic diagram in which the layer 1, the layer 2, the layer 3, and the information layer are synthesized in a certain sequence. As shown in FIG. 5, the plurality of layers are the information layer, the layer 1, the layer 2, and the layer 3 in sequence. The information layer may be used to display the time, the date, the notification message, the incoming call reminder message, the battery identifier, or the like. The layer 1 is used to display a window, and a shape of the window may change over time. The layer 2 is used to display the scene pattern, and the scene pattern may change with a heart rate or the quantity of steps. The layer 3 is used to display the sky, and a pattern on and brightness of the sky change with time and weather. A screen-off image 14 is obtained by superimposing the information layer, the layer 1, the layer 2, and the layer 3. The four layers may be dynamically superimposed and combined according to different scenes, so that a screen-off image that changes dynamically can be obtained.

It should be noted that a sequence in which the information layer, the layer 1, the layer 2, and the layer 3 are superimposed is not limited in this embodiment of this application, and a specific superimposition sequence may be determined according to an actual usage requirement. The layer superimposition principle is as follows: content displayed on the information layer is not blocked by other layers.

In a case that the electronic device is in a screen-off state, the electronic device may display the screen-off image that includes various information such as a time, a date, a notification message, an incoming call reminder message, a power identifier, a user behavior, and weather on the screen, and the screen-off image may be dynamically updated as the scene changes, which improves the display effect.

Figure 6:
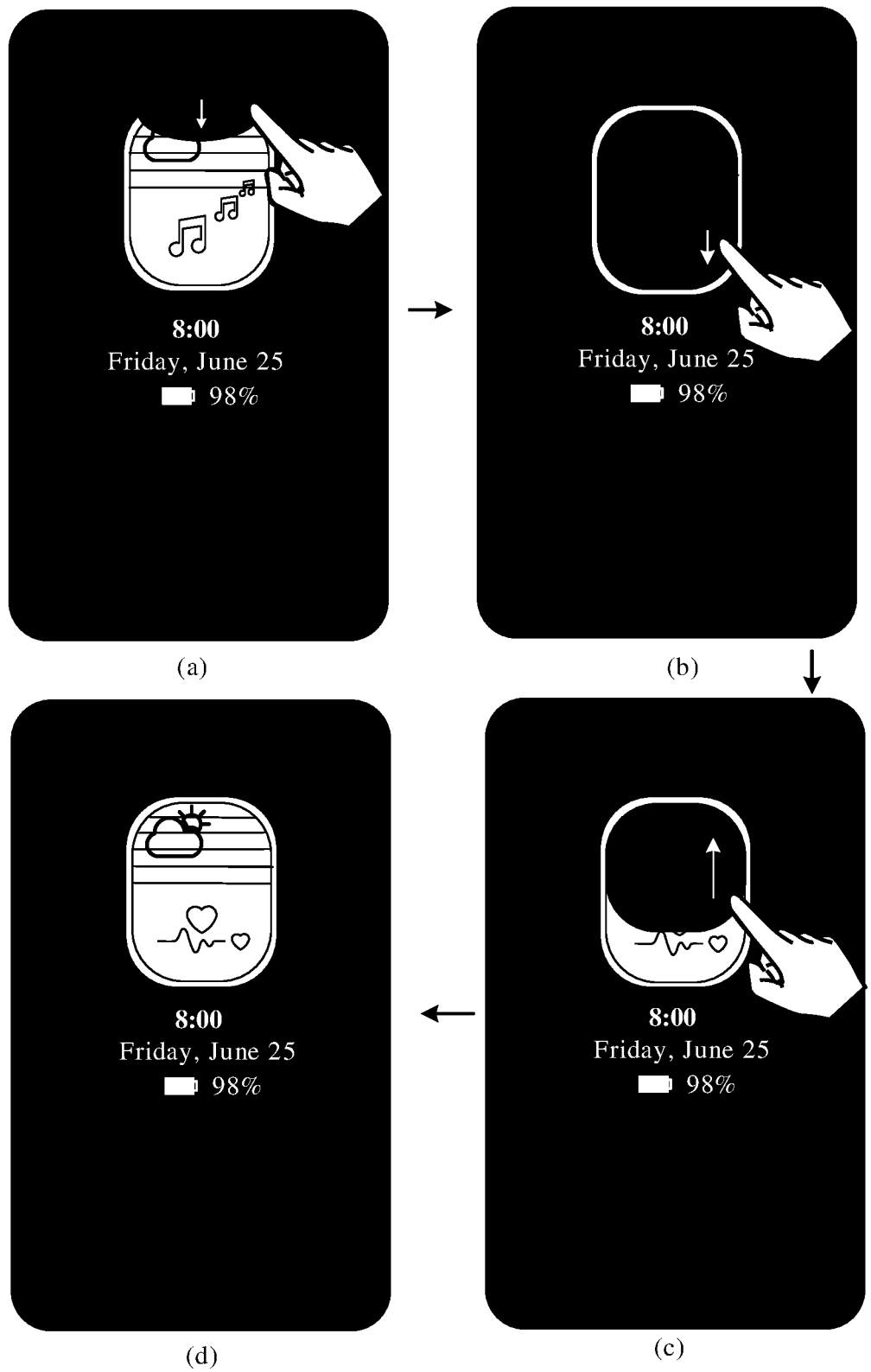
FIG. 6 is a schematic diagram 1 of an interface on which an always on display control method is applied to an electronic device according to an embodiment of this application.

Optionally, in this embodiment of this application, in a case that the electronic device during screen off displays screen-off images, as shown in (a) and (b) in FIG. 6, the electronic device may trigger the foreground window that is in an on state to be switched to an off state in response to an operation performed by the user on the screen-off image (for example, swiping from top to bottom). As shown in (b) in FIG. 6, in a case that the foreground window is in the off state, a region in which the foreground window is located is opaque. Optionally, the region may be in a specific color such as blue or black.

As shown in (c) and (d) in FIG. 6, the electronic device may trigger the foreground window that is in the off state to be switched to the on state in response to an operation performed by the user on the screen-off image (for example, swiping from bottom to top). As shown in (d) in FIG. 6, in a case that the foreground window is in the on state, the region in which the foreground window is located may be translucent or completely transparent.

Optionally, in this embodiment of this application, in a case that the electronic device during screen off displays the screen-off image, the electronic device may display a louver effect on a part or all of the foreground window in response to an operation of swiping on the screen-off image along a preset direction by the user (for example, long pressing and swiping from top to bottom on the screen-off image).

Optionally, in this embodiment of this application, in a case that the foreground window is switched from the off state to the on state, the electronic device may update the scene pattern on the foreground window, or update the background pattern, or update the scene pattern and the background pattern simultaneously.

In this embodiment of this application, in response to operations by the user, different screen-off patterns or styles may be set for the electronic device.

Figure 7A:
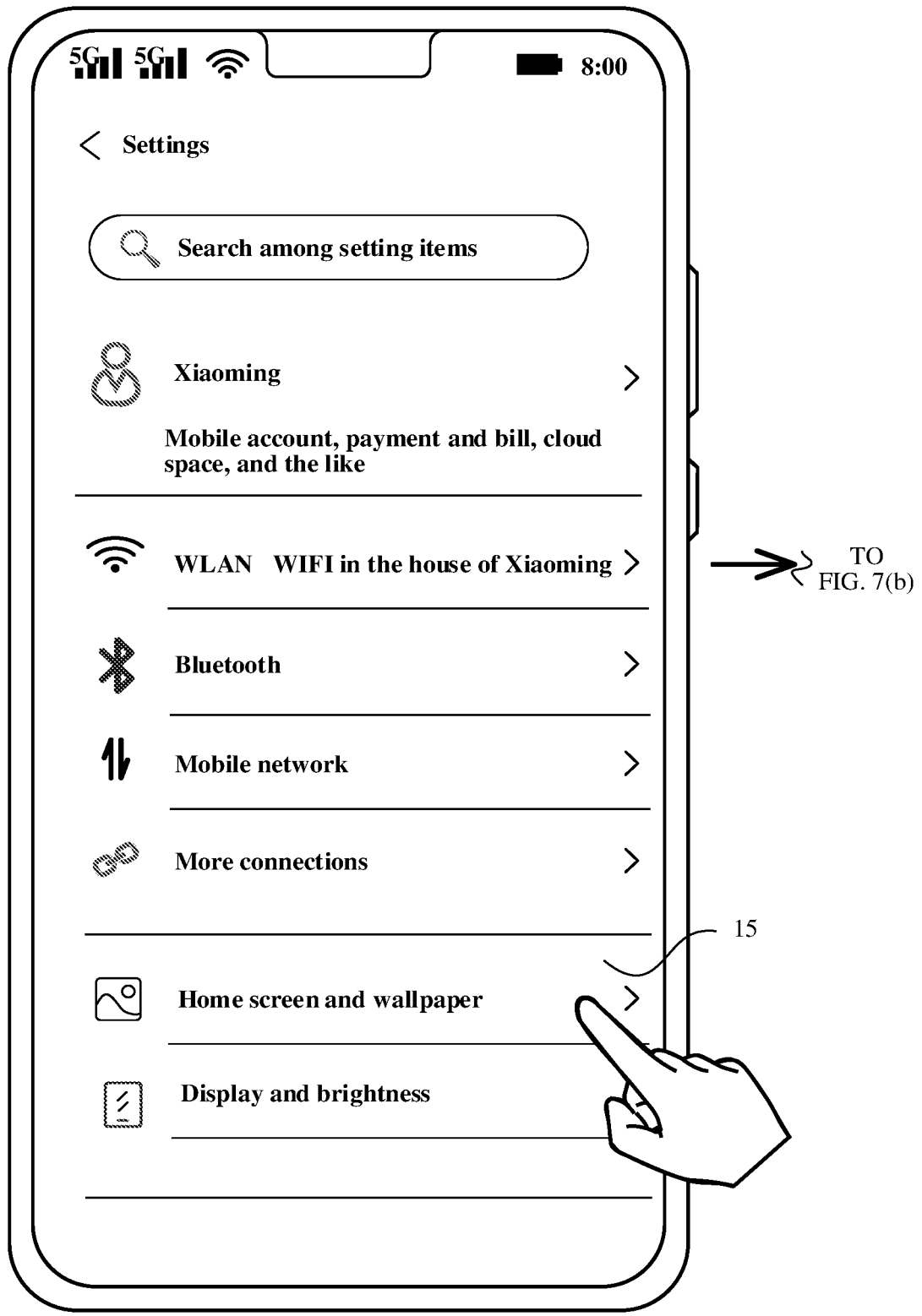
FIGS. 7(a)-7(d) illustrate a schematic diagram 2 of an interface on which an always on display control method is applied to an electronic device according to an embodiment of this application.
Figure 7B:
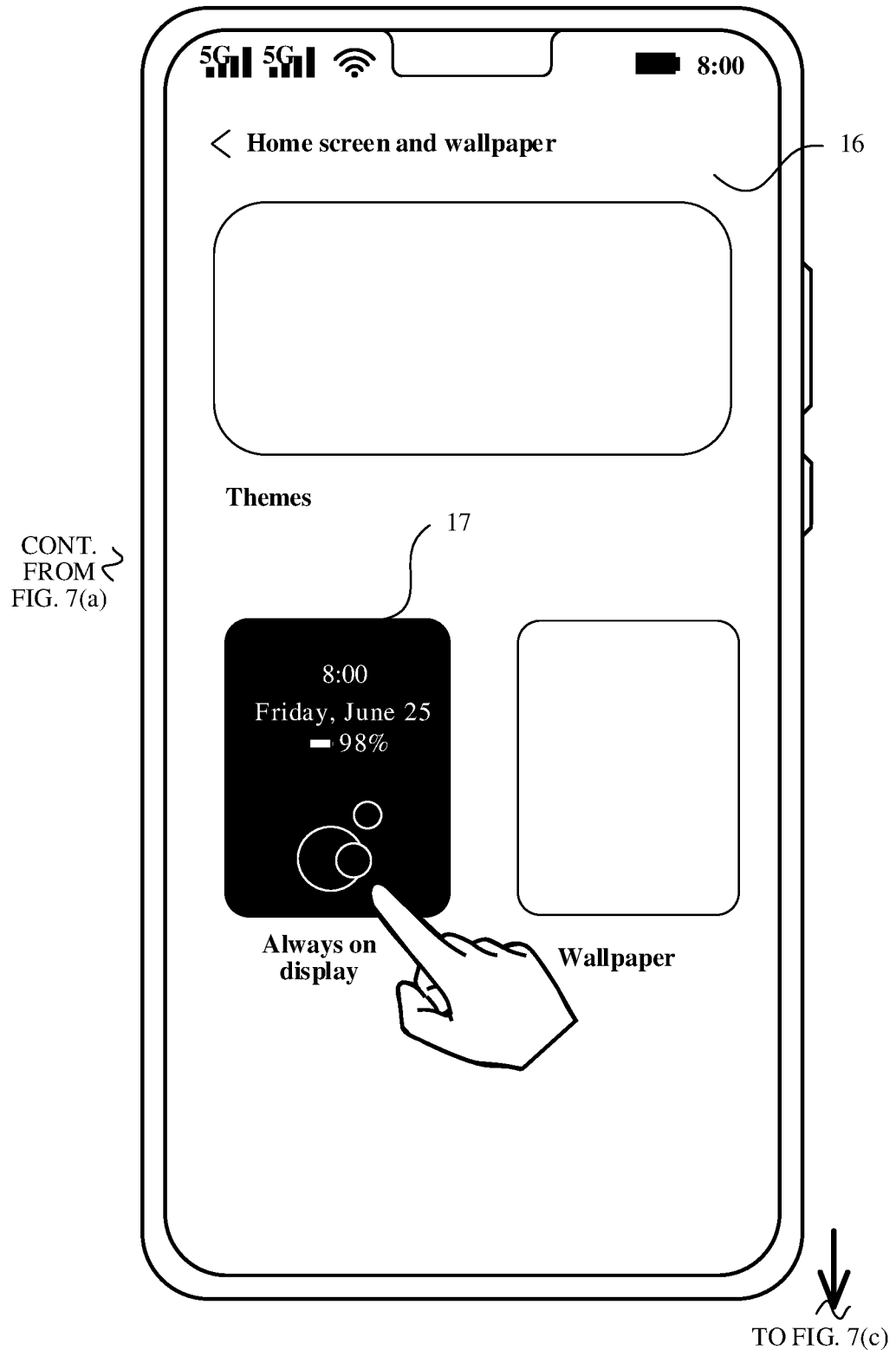
Figure 7C:
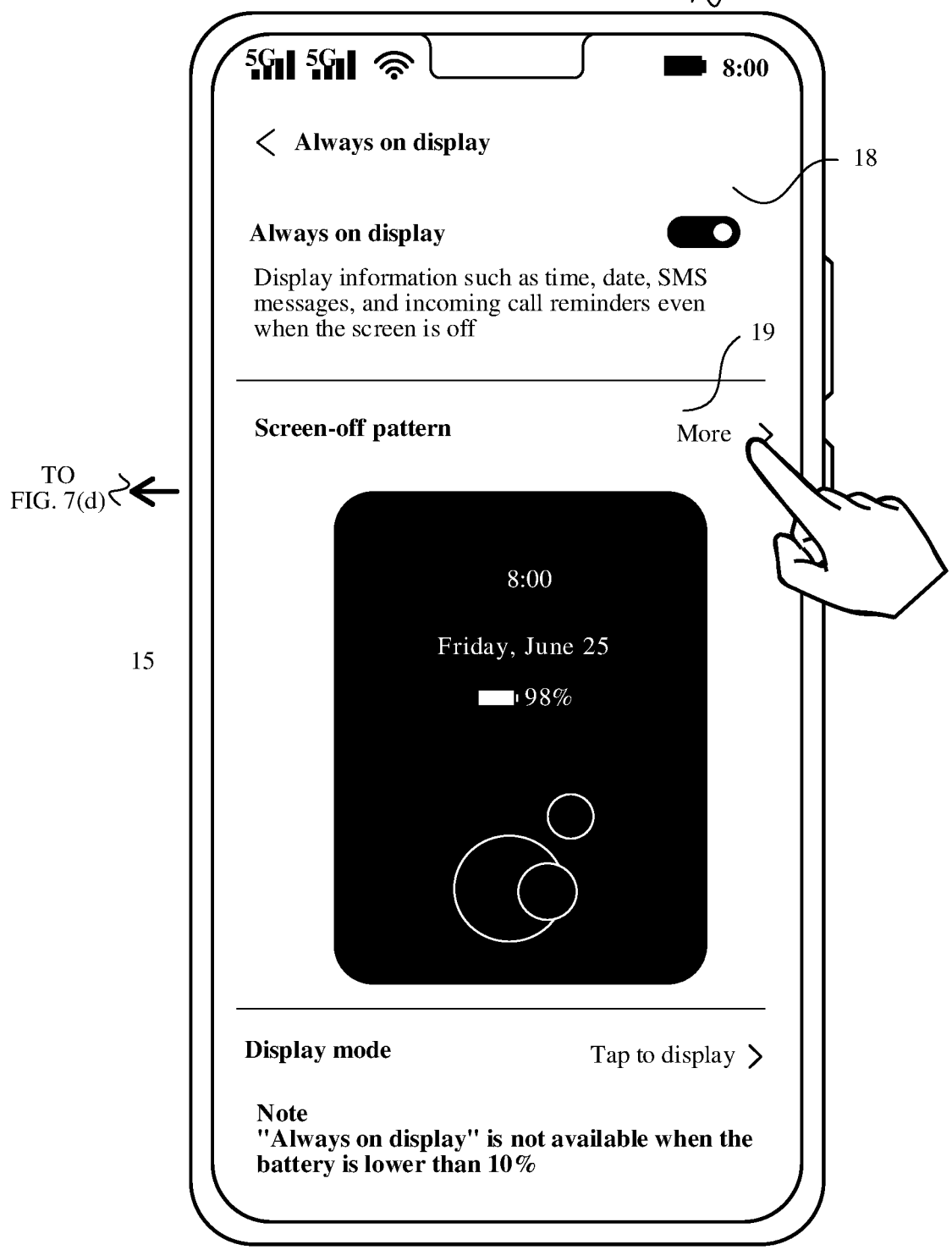
Figure 7D:
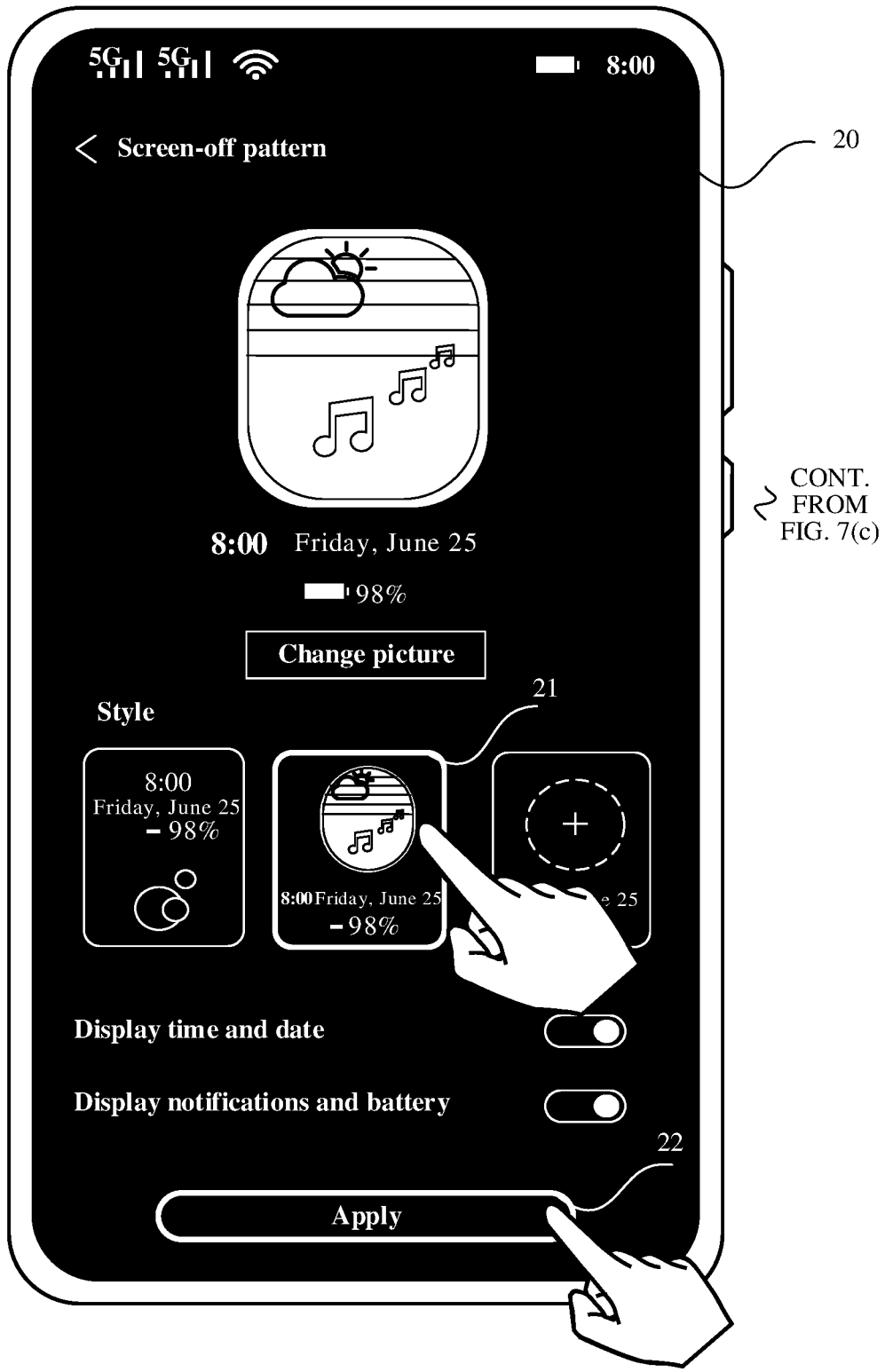

Exemplarily, as shown in FIG. 7(a), a setting interface of the electronic device includes a home screen and wallpaper option 15. In a case that the user selects the home screen and wallpaper option 15, as shown in FIG. 7(b), the electronic device may jump to a home screen and wallpaper interface 16 in response to this operation, and an always on display setting option 17 is displayed on the interface 16. As shown in FIG. 7(b) and FIG. 7(c), the electronic device jumps to an always on display setting interface 18 in response to an operation performed on the always on display setting option 17 by the user. A screen-off pattern option 19 is displayed on the always on display setting interface 18. Further, as shown in FIG. 7(c) and FIG. 7(d), the electronic device jumps to a screen-off pattern interface 20 in response to an operation performed on the screen-off pattern option 19 by the user. Various screen-off patterns or styles, such as a screen-off style option 21, are displayed on the screen-off pattern interface 20. As shown in FIG. 7(d), the electronic device sets a screen-off style corresponding to the screen-off style option 21 to be a display style during screen off in response to an operation performed on the screen-off style option 21 and an operation performed on an application control 22 by the user.

In this embodiment of this application, the electronic device may set a picture for always on display in response to the operation by the user.

Figure 8A:
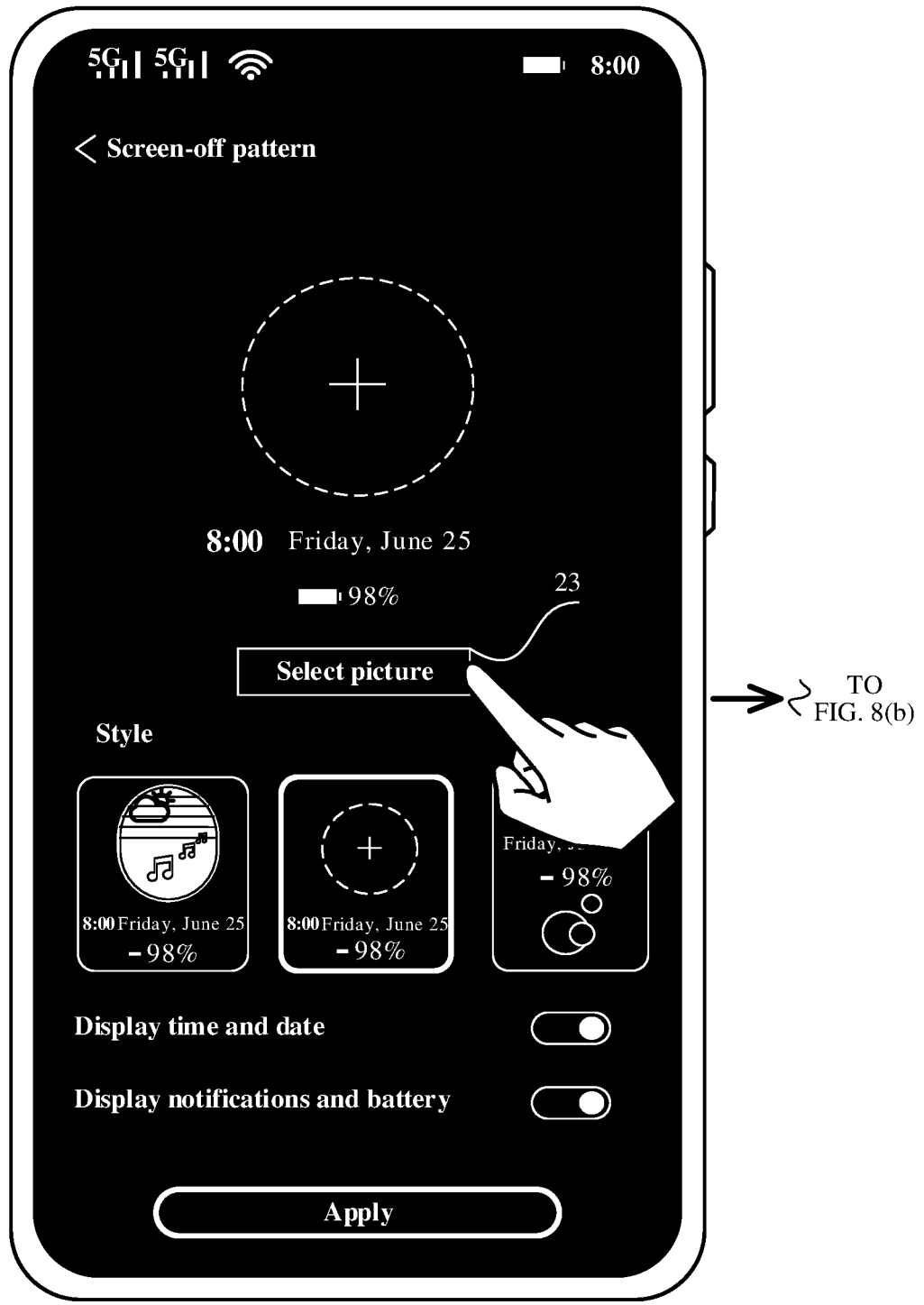
FIGS. 8(a)-8(d) illustrate a schematic diagram 3 of an interface on which an always on display control method is applied to an electronic device according to an embodiment of this application.
Figure 8B:
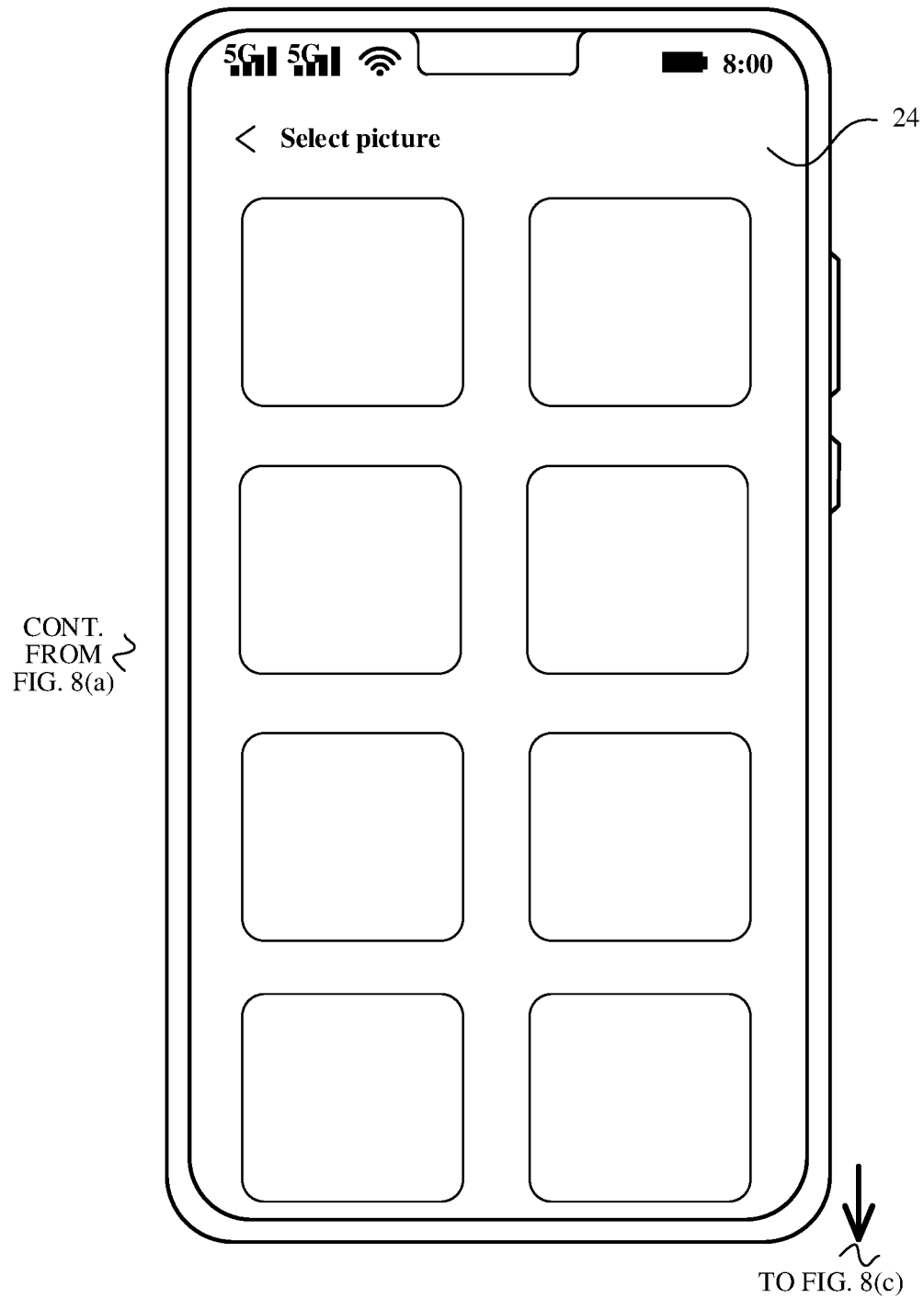
Figure 8C:
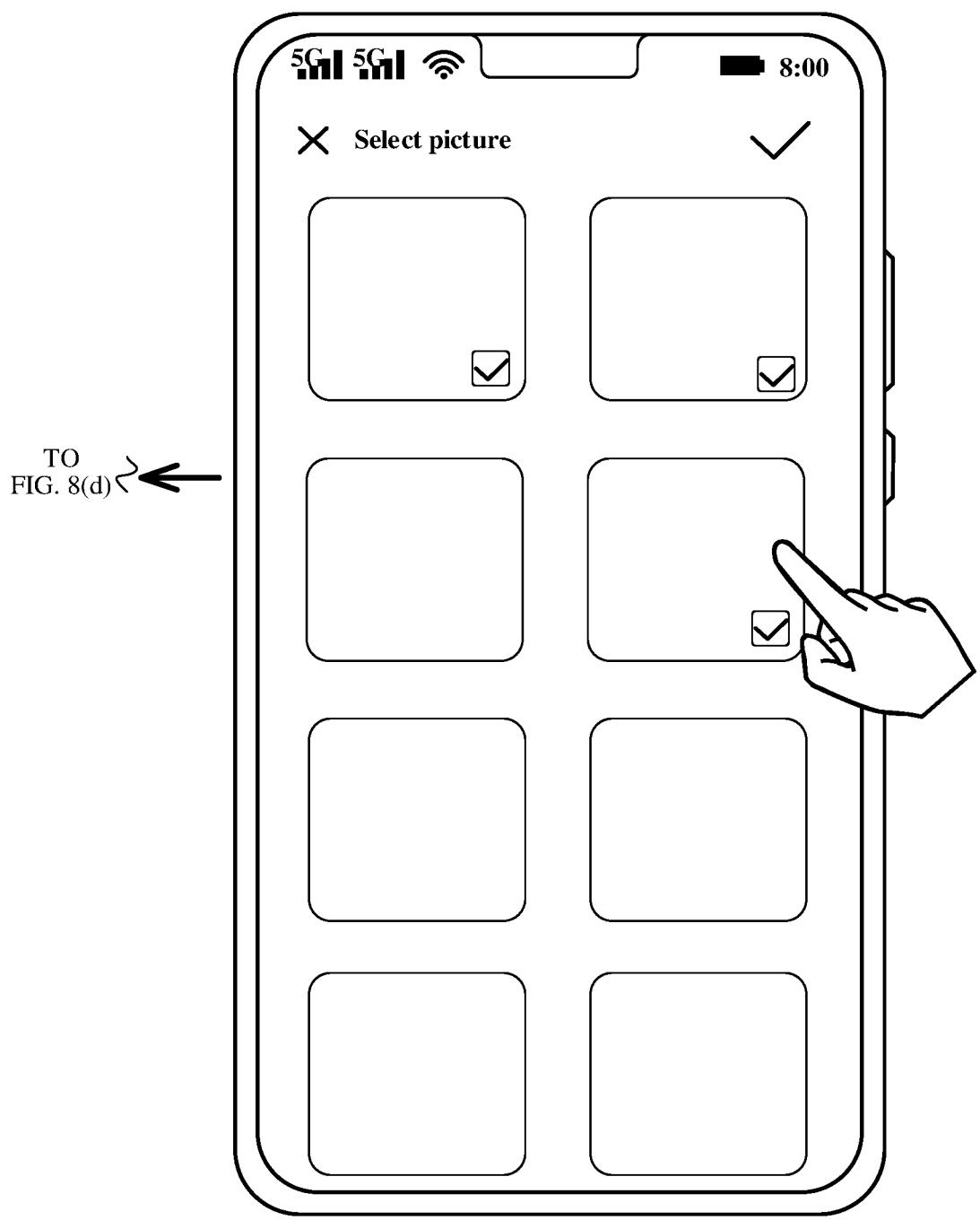
Figure 8D:
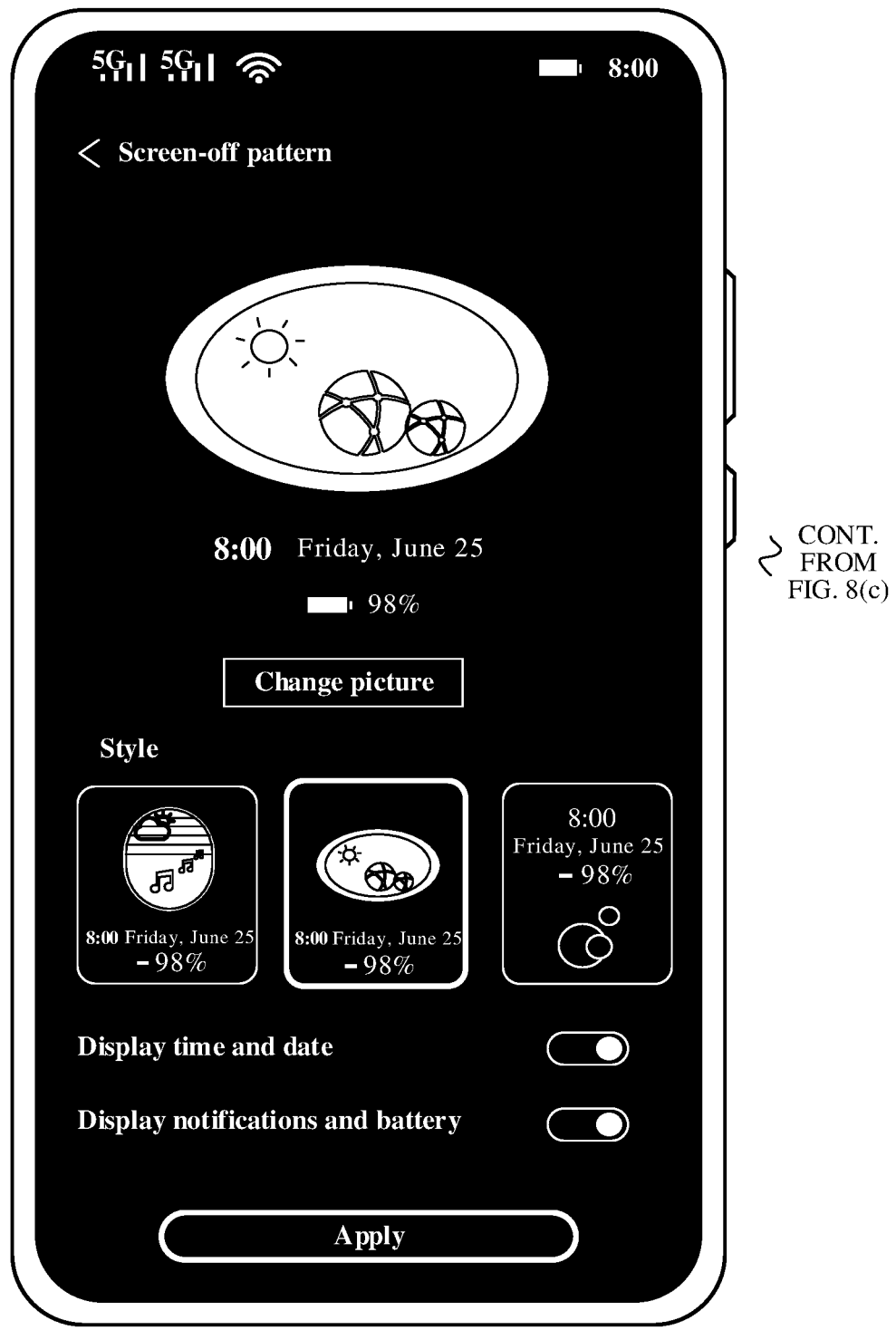

Exemplarily, as shown in FIG. 8(a), the screen-off pattern interface of the electronic device includes a picture selection control 23. In response to an operation performed on the picture selection control 23 by the user, the electronic device jumps to a picture selection interface 24 as shown in FIG. 8(b). As shown in FIG. 8(c), in response to a selection operation performed on at least one of pictures on the picture selection interface 24 by the user, the electronic device may set a selected picture as the scene pattern and/or the background pattern as shown in FIG. 8(d).

It should be noted that the foregoing picture selection interface may include a static picture or a dynamic picture stored locally in the electronic device, and/or a static picture or a dynamic picture stored in a network server, and this is not limited in this embodiment of this application.

In this embodiment of this application, the electronic device may enable the always on display function in response to the operation by the user. As shown in (a) in FIG. 9, the always on display setting interface of the electronic device includes an always on display control 25. The user may trigger the electronic device to enable or disable the always on display function by performing an operation on the always on display control 25. For example, after the always on display function is enabled, during screen off, information such as a time, a date, an SMS message, and an incoming call reminder may be displayed, and the screen-off image may be dynamically updated and displayed.

The information such as the time or the date may be presented on a display screen of the electronic device in different presentation manners. For example, a clock may be presented in a form of a clock dial or Arabic numerals, and a notification may be presented in a form of a small application icon, text, or the like. This is not specifically limited herein.

Optionally, in this embodiment of this application, the electronic device may set an always on display mode in response to the operation by the user. Further, in a case that the electronic device is in the screen-off state, the electronic device may display the screen-off image in the always on display mode. Exemplarily, the always on display mode may include any of the following: a tap to display mode, a timing display mode, or an all-day display mode.

Figure 9:
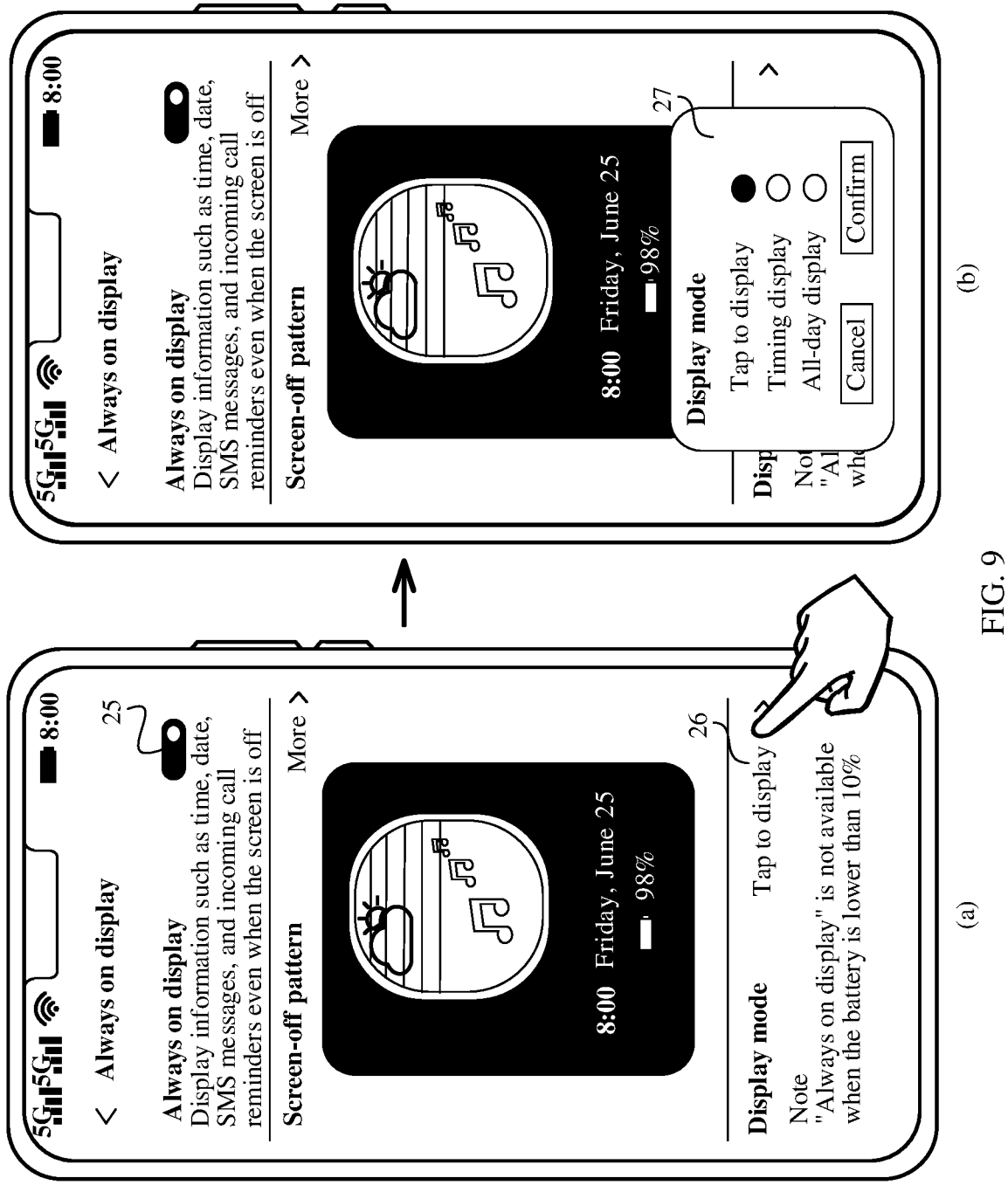
FIG. 9 is a schematic diagram 4 of an interface on which an always on display control method is applied to an electronic device according to an embodiment of this application.

As shown in (a) in FIG. 9, the always on display setting interface of the electronic device further includes a display mode control 26. As shown in (b) in FIG. 9, a display mode selection box 27 may pop up on the electronic device in response to an operation performed on the display mode control 26 by the user. The display mode selection box 27 includes the tap to display mode, the timing display mode, and the all-day display mode. The user may select any one of the display modes to trigger the electronic device to set the display mode during screen off.

Exemplarily, the electronic device may set the always on display mode to be the tap to display mode in response to an operation of selecting the tap to display mode by the user. In a case that the electronic device is in the screen-off state, the electronic device may display the screen-off image in the tap to display mode. That is, in a case that the electronic device is in the screen-off state, the user may trigger the electronic device to display the screen-off image by lightly touching the screen.

Exemplarily, the electronic device may set the always on display mode to be the timing display mode in response to an operation of selecting the timing display mode by the user. For example, a time range corresponding to the timing display mode may be set to be from 8 am to 10 pm. In a case that the electronic device is in the screen-off state, the electronic device may display the screen-off image in the timing display mode. That is, in a case that the electronic device is in the screen-off state and a current moment is within a timed time range, the electronic device may be automatically triggered to display the screen-off image.

Exemplarily, the electronic device may set the always on display mode to be the all-day display mode in response to an operation of selecting the all-day display mode by the user. In a case that the electronic device is in the screen-off state, the electronic device may display the screen-off image in the all-day display mode. That is, as long as the electronic device is in the screen-off state, the electronic device continuously displays the screen-off image.

In this embodiment of this application, a plurality of layers may be preset, and each layer corresponds to a type of information. The plurality of layers are combined according to different situations.

In this embodiment of this application, the plurality of layers may be combined into a complete AOD screen-off image, and each of the plurality of layers may change according to different trigger factors.

For the layer 1 (that is, a foreground layer), the display element is the foreground window, and the trigger factor thereof may include user position/trip information, a user click operation, or the like. The layer 1 corresponds to the trip information (for example, on a business trip, in a company, and at home), which is distinguished by using windows in different shapes. For example, the shape of the window presented on the layer 1 may change with positioning of the user (at home, in a company, or on a trip).

For the layer 2 (that is, a mid-ground layer), the display element is the scene pattern, and the trigger factor thereof may include: an application enabled by the mobile phone, a quantity of counted steps, a heart rate value, or a user click operation. The layer 2 corresponds to scene information (for example, listening to music, doing sports, and watching a video), which is distinguished by using different scene patterns. For example, the scene pattern on the layer 2 may be switched at a time at which the window is disabled and then enabled.

For the layer 3 (that is, a background layer), the display element is the background pattern, for example, using the sky as the background, and the trigger factor thereof may include: a time, a season, a temperature, weather, or the like. The layer 3 corresponds to weather and time information (for example, weather, morning or evening, the season, and the temperature), which is distinguished by using different sky patterns. For example, different sky states may be presented on the layer 3 throughout a day.

Compared with an always on display effect of usually being a fixed picture or a segment of an animation in the prior art, through this solution of this application, the pattern displayed during screen off may dynamically change with different scenes, which improves the always on display effect.

It should be noted that, in the embodiments of this application, the example in which the electronic device is a mobile phone is used. Only parts, related to the embodiments of this application, of the structure related to the display screen of the mobile phone are illustrated, and the description of the structure related to the display screen of the mobile phone and related concept explanation may be limited due to specific situations of the embodiments of this application. However, this does not mean that this application can only be limited to the specific situations, and there may be differences between the specific situations of different embodiments, which are not specifically limited herein.

Currently, two types of display screens of mobile phones are commonly used in the market, namely, the liquid crystal display (liquid crystal display, LCD) screen and the organic light-emitting diode (organic light-emitting diode, OLED) screen. The LCD screen is constructed as follows: A liquid crystal cell is placed between two parallel substrates made of glass, where a thin film transistor (thin film transistor, TFT) is arranged on the glass of the lower substrate, and a color filter is arranged on the glass of the upper substrate; and a rotation direction of a liquid crystal molecule is controlled by changing a signal and a voltage on the TFT, to control whether to emit polarized light of each pixel on the screen to achieve a display purpose. The OLED screen uses an extremely thin coating made of organic materials (also referred to as an organic light-emitting layer) and a substrate made of a glass. In a case that an electric current passes through, these organic materials emit light.

That is, mobile phones with the two types of display screens can both support an AOD mode. In the AOD mode (also referred to as an AOD state), some regions on the display screen of the mobile phone can display information such as a clock, a date, and a notification.

It should be noted that although both the mobile phone with the LCD screen and the mobile phone with OLED screen support the AOD mode, the mobile phone with the LCD screen and the mobile phone with OLED screen implement an AOD function in different manners. A characteristic of the OLED screen is that each pixel on the screen can emit light independently, and a principle of the AOD thereof is to light up only some pixels on the OLED screen, to display the foregoing information such as the clock, the date, and the notification. The LCD screen reserves a small region on the entire display screen, to display the foregoing information such as the clock, the date, and the notification on the small region, while the other regions other than the small region are pure black. A type of the display screen of the electronic device is not limited in the embodiments of this application, for example, the display screen of the electronic device may be an LCD screen, or may be an OLED screen.

In the embodiments of this application, the display screen of the mobile phone may also cover a touch panel, and information is inputted and outputted through the display panel. In some mobile phones with full screens, the display screens of the mobile phone may further include a region for in-display fingerprints (for example, an optical fingerprint and an ultrasonic fingerprint), and this is not specifically limited herein.

It should further be noted that in the embodiments of this application, "greater than" may be replaced with "greater than or equal to", and "less than or equal to" may be replaced with "less than", or "greater than or equal to" may be replaced with "greater than", and "less than" may be replaced with "less than or equal to".

The embodiments described herein may be independent solutions, or may be combined according to internal logic. The solutions all fall within the protection scope of this application.

It may be understood that, in the foregoing method embodiments, the methods and operations implemented by the electronic device may alternatively be implemented by a component (for example, a chip or a circuit) that may be used in the electronic device.

The method embodiments provided by this application are described above, and apparatus embodiments provided by this application are to be described below. It should be understood that the descriptions of the apparatus embodiments correspond to the descriptions of the method embodiments. Therefore, for content that is not described in detail, reference may be made to the foregoing method embodiments. For brevity, details are not repeated herein again.

The foregoing describes the solutions provided in the embodiments of this application mainly from the perspective of the steps of the method. It may be understood that, to implement the foregoing functions, the electronic device implementing the method includes corresponding hardware structures and/or software modules for performing various functions. A person of ordinary skill in the art may be aware that, the exemplary units and algorithm steps described with reference to the embodiments disclosed in this specification may be implemented by hardware, or a combination of hardware and computer software. Whether a function is performed by hardware or computer software driving hardware depends on particular applications and design constraints of the technical solutions. A person skilled in the art may use different methods to implement the described functions for each particular application, but it should not be considered that the implementation goes beyond the protection scope of this application.

In the embodiments of this application, functional modules of the electronic device may be divided based on the foregoing method examples. For example, various functional module may be divided according to the corresponding functions, or two or more functions may be integrated into one processing module. The integrated module may be implemented in a form of hardware, or may be implemented in a form of a software functional module. It should be noted that the division of the modules in the embodiments of this application is illustrative and is merely logical function division, and there may be another division manner during actual implementation. The following descriptions are made by using an example in which the functional modules are divided according to the corresponding functions.

Figure 10:
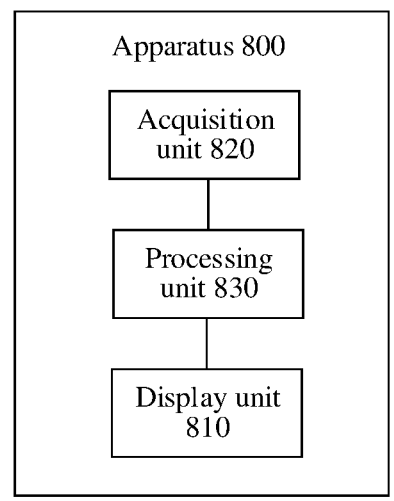
FIG. 10 is a schematic structural diagram of an always on display control apparatus according to an embodiment of this application.

FIG. 10 is a schematic block diagram of an always on display control apparatus 800 according to an embodiment of this application. The apparatus 800 may be configured to perform actions performed by the electronic device in the foregoing method embodiments. The apparatus 800 includes a display unit 810.

The display unit 810 is configured to display a screen-off image in a case that the apparatus 800 is in a screen-off state, where the screen-off image includes a plurality of layers, and the plurality of layers include different display elements;

the display unit 810 is further configured to update and display a display element on a first layer in the screen-off image in a case that the apparatus 800 meets a preset condition, where the display element on the first layer includes a foreground window, and the preset condition includes that: the apparatus 800 detects that user positioning information changes, or the apparatus 800 receives a first operation performed by a user on the screen-off image;

the display unit 810 is further configured to update and display a display element on a second layer in the screen-off image in a case that the apparatus 800 detects that user behavior information changes, where the display element on the second layer includes a scene pattern; and the display unit 810 is further configured to update and display a display element on a third layer in the screen-off image in a case that the apparatus 800 detects that time and meteorological information changes, where the display element on the third layer includes a background pattern.

Through this solution, a plurality of layers may be preset. Each layer corresponds to a type of information, and may change according to different information trigger factors. The plurality of layers may be dynamically superimposed and combined according to different scenes, and therefore, may be combined into an AOD screen-off image that changes dynamically. In a case that the apparatus is in the screen-off state, the apparatus may display the screen-off image that includes information such as a time, a date, a notification message, an incoming call reminder message, a power identifier, a user behavior, and weather on a screen, and the screen-off image may be dynamically updated as the scene changes. Compared with an always on display effect of usually displaying a fixed picture or a segment of an animation in the prior art, through this solution of this application, the pattern displayed during screen off may dynamically change with different scenes, which improves the always on display effect.

In a possible implementation, the user positioning information includes: at home, in a company, or on a trip.

In a possible implementation, the user behavior information includes: an entertainment state, a learning state, and/or a sports state.

In a possible implementation, the time and meteorological information includes: a time in the morning/at noon/in the evening, a season, and/or weather.

In a possible implementation, as shown in FIG. 10, the apparatus 800 may further include an acquisition unit 820 and a processing unit 830, where the acquisition unit 820 is configured to obtain M types of information; and the processing unit 830 is configured to: determine a display element corresponding to each type of information according to each type of information in the M types of information; generate M layers having different display elements according to the display elements respectively corresponding to the M types of information; and superimpose the M layers having different display elements, to obtain the screen-off image.

Further, in a case that the apparatus 800 is in the screen-off state, the display unit 810 displays the foregoing screen-off image.

In a possible implementation, the acquisition unit 820 may acquire the M types of information in real time or periodically.

In a possible implementation, in a case that M is 3, the M types of information includes the user positioning information, the user behavior information, and the time and meteorological information, where the display element corresponding to the user positioning information is the foreground window, and the corresponding foreground window changes with the user positioning information;

the display element corresponding to the user behavior information is the scene pattern, and the corresponding scene pattern changes with the user behavior information;

the display element corresponding to the time and meteorological information is the background pattern, and the corresponding background pattern changes with the time and meteorological information.

In a possible implementation, the processing unit 830 is further configured to:

use a layer having the foreground window corresponding to the user positioning information as the first layer;

use a layer having the scene pattern corresponding to the user behavior information as the second layer; and use a layer having the background pattern corresponding to the time and meteorological information as the third layer, where the M layers include the first layer, the second layer, and the third layer.

In a possible implementation, the display unit 810 is further configured to display at least one of a time, a date, a notification message, an incoming call reminder message, and a power identifier in a case that the apparatus 800 is in the screen-off state.

In a possible implementation, the display unit 810 is further configured to superimpose and display the plurality of layers in the screen-off image in a preset layer superposition sequence.

The preset layer superposition sequence may be that the first layer is on the uppermost layer, the second layer is between the first layer and the third layer, and the third layer is on the bottom layer.

In a possible implementation, the processing unit 830 is further configured to: update the layer superposition sequence in response to a second operation by the user; or periodically update the layer superposition sequence.

In a possible implementation, the display unit 810 is further configured to:

switch the foreground window on the first layer in the screen-off image from an off state to an on state in response to the first operation performed by the user on the screen-off image; or switch the foreground window on the first layer in the screen-off image from an on state to an off state in response to the first operation performed by the user on the screen-off image; or display a louver effect on the foreground window on the first layer in the screen-off image in response to the first operation performed by the user on the screen-off image.

Exemplarily, in a case that the apparatus 800 during screen off displays the screen-off image, the apparatus displays the louver effect on a part or all of the foreground window in response to a fifth operation of swiping on the screen-off image along a preset direction by the user.

In a possible implementation, the display unit 810 is further configured to:

update and display the scene pattern on the second layer in a case that the foreground window on the first layer in the screen-off image is switched from the off state to the on state.

In a possible implementation, the processing unit 830 is further configured to determine the foreground window corresponding to the user positioning information according to the user positioning information and a first preset relationship, where the first preset relationship is a preset correspondence between the user positioning information and a foreground window in a specific shape or size.

In a possible implementation, the processing unit 830 is further configured to determine the scene pattern corresponding to the user behavior information according to the user behavior information and a second preset relationship, where the second preset relationship is a preset correspondence between the user behavior information and a scene pattern with specific content.

In a possible implementation, the processing unit 830 is further configured to determine, according to an application that is running on the apparatus 800, behavior information that the user acts on the apparatus 800 as the user behavior information.

In a possible implementation, the processing unit 830 is further configured to: acquire user sports data according to the application that is running on the apparatus 800; and determine that the user behavior information includes the sports state in a case that the apparatus 800 determines that the user sports data meets a preset sports condition, where the user sports data includes a heart rate value of the user and/or a quantity of steps of the user within a preset duration.

In a possible implementation, the processing unit 830 is further configured to determine the background pattern corresponding to the time and meteorological information according to the time and meteorological information and a third preset relationship, where the third preset relationship is a preset correspondence between the time and meteorological information and a background pattern with a specific pattern, color and/or specific brightness.

In a possible implementation, the display unit 810 is further configured to display the screen-off image in a first always on display mode, where the first always on display mode includes any of the following: a tap to display mode, a timing display mode, or an all-day display mode.

In a possible implementation, the processing unit 830 is further configured to set an always on display mode to be the first always on display mode in response to a third operation by the user.

In a possible implementation, the processing unit 830 is further configured to enable an always on display function in response to a fourth operation by the user.

In a possible implementation, the display unit 810 is further configured to display a setting interface of the always on display function in response to a fifth operation by the user, where the setting interface includes a preset gallery, and the preset gallery includes an image stored locally in the apparatus 800 and/or an image stored in a network server.

The processing unit 830 is further configured to use, in response to a sixth operation of selecting an image from the preset gallery by the user, the selected image as a display element on a target layer in the screen-off image.

The apparatus 800 according to this embodiment of this application may correspond to the method described in the embodiments of this application, and the foregoing and other operations and/or functions of the units in the apparatus 800 are respectively for implementing corresponding procedures in the method. For brevity, details are not described herein again.

Figure 11:
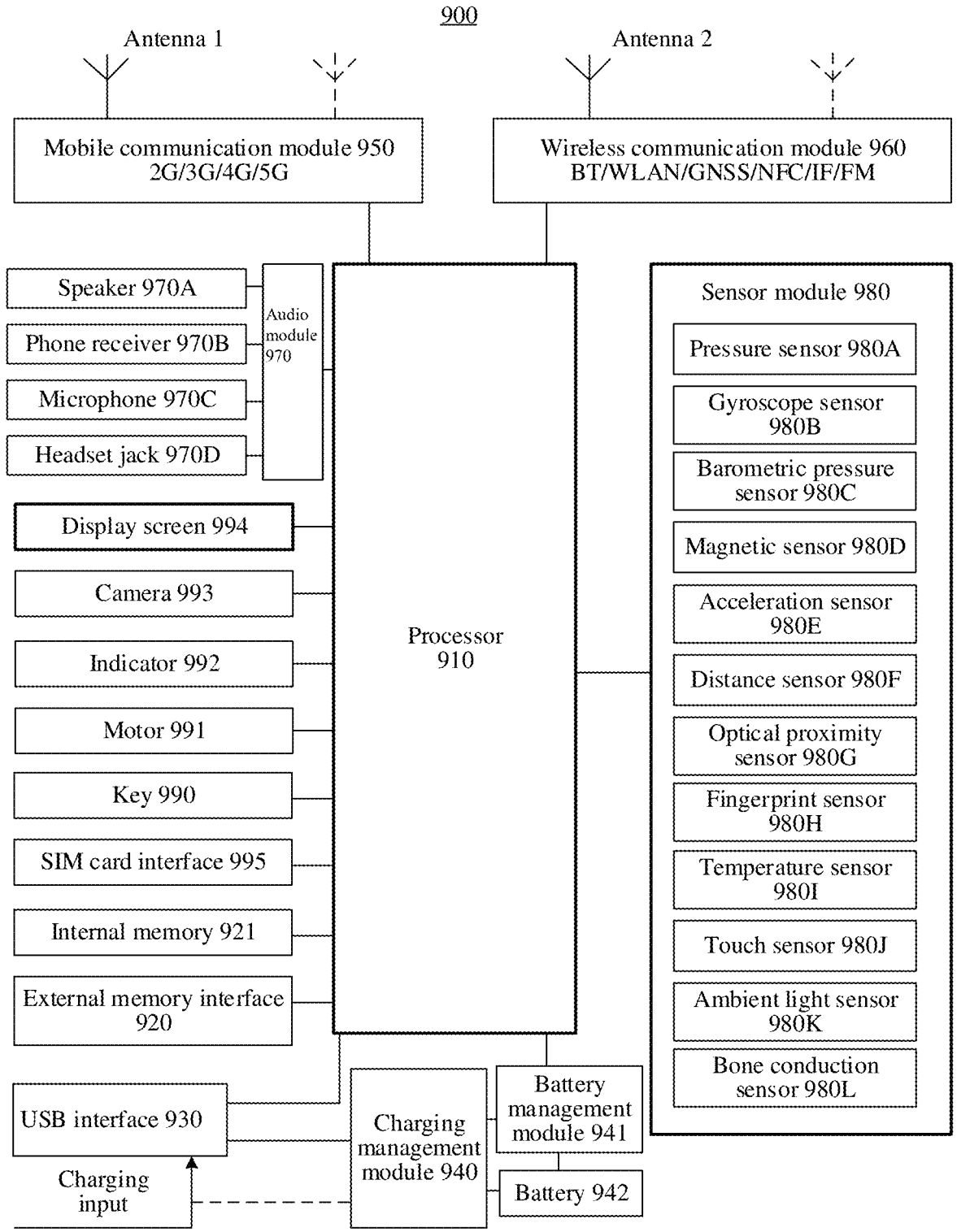
FIG. 11 is a schematic structural diagram of an electronic device according to an embodiment of this application.

FIG. 11 is a schematic structural diagram of an electronic device 900 according to an embodiment of this application. The electronic device 900 may include a processor 910, an external memory interface 920, an internal memory 921, a universal serial bus (universal serial bus, USB) interface 930, a charging management module 940, a power management unit 941, a battery 942, an antenna 1, an antenna 2, a mobile communication module 950, a wireless communication module 960, an audio module 970, a speaker 970A, a phone receiver 970B, a microphone 970C, a headset jack 970D, a sensor module 980, a key 990, a motor 991, an indicator 992, a camera 993, a display screen 994, a subscriber identity module (subscriber identification module, SIM) card interface 995, and the like. The sensor module 980 may include a pressure sensor 980A, a gyroscope sensor 980B, a barometric pressure sensor 980C, a magnetic sensor 980D, an acceleration sensor 980E, a distance sensor 980F, an optical proximity sensor 980G, a fingerprint sensor 980H, a temperature sensor 980I, a touch sensor 980J, an ambient light sensor 980K, a bone conduction sensor 980L, and the like.

It may be understood that the schematic structure in this embodiment of this application does not constitute a specific limitation on the electronic device 900. In some other embodiments of this application, the electronic device 900 may include more or fewer components than those shown in the figure, or some components may be combined, or some components may be split, or components are arranged in different manners. The components in the figure may be implemented by hardware, software, or a combination of software and hardware.

The processor 910 may include one or more processing units. For example, the processor 910 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be separate components, or may be integrated into one or more processors. The controller may be a nerve center and a command center of the electronic device 900. The controller may generate an operation control signal based on an instruction operation code and a timing signal, and read an instruction and control execution of the instruction.

A memory may be further configured in the processor 910, to store an instruction and data. In some embodiments, the memory in the processor 910 is a cache memory. The memory may store an instruction or data that is recently used or cyclically used by the processor 910. If the processor 910 needs to use the instruction or the data again, the processor may directly invoke the instruction or the data from the memory, which avoids repeated access and reduces a waiting time of the processor 910, thereby improving system efficiency.

In some embodiments, the processor 910 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like. It may be understood that a schematic interface connection relationship between the modules in this embodiment of this application is merely an example for description, and constitutes no limitation on the structure of the electronic device 900. In some other embodiments of this application, the electronic device 900 may alternatively use an interface connection manner different from that in the foregoing embodiment, or use a combination of a plurality of interface connection manners.

The charging management module 940 is configured to receive a charging input from a charger. The charger may be a wireless charger, or may be a wired charger. In some embodiments of wired charging, the charging management module 940 may receive a charging input from a wired charger by using the USB interface 930. In some embodiments of wireless charging, the charging management module 940 may receive a wireless charging input by using a wireless charging coil of the electronic device 900. The charging management module 940 may supply power to the electronic device by using the power management unit 941 while charging the battery 942.

The power management unit 941 is configured to connect to the battery 942, the charging management module 940, and the processor 910. The power management unit 941 receives an input from the battery 942 and/or the charging management module 940, to supply power to the processor 910, the internal memory 921, an external memory, the display screen 994, the camera 993, the wireless communication module 960, and the like. The power management unit 941 may be further configured to monitor parameters such as a battery capacity, a battery cycle count, and a battery state of health (electric leakage and impedance). In some other embodiments, the power management unit 941 may alternatively be arranged in the processor 910. In some other embodiments, the power management unit 941 and the charging management module 940 may alternatively be arranged in a same component.

A wireless communication function of the electronic device 900 may be implemented by using the antenna 1, the antenna 2, the mobile communication module 950, the wireless communication module 960, the modem processor, the baseband processor, and the like.

The antenna 1 and the antenna 2 are configured to transmit and receive electromagnetic wave signals. Each antenna in the electronic device 900 may be configured to cover one or more communication frequency bands. Different antennas may further be multiplexed to improve utilization of the antennas. For example, the antenna 1 may be multiplexed as a diversity antenna of a wireless local area network. In some other embodiments, the antennas may be used with a tuning switch.

The mobile communication module 950 may provide a solution to wireless communication such as 2G/3G/4G/5G applied to the electronic device 900. The mobile communication module 950 may include at least one filter, a switch, a power amplifier, a low noise amplifier (low noise amplifier, LNA), and the like. The mobile communication module 950 may receive an electromagnetic wave by using the antenna 1, perform processing such as filtering and amplification on the received electromagnetic wave, and send the electromagnetic wave to the modem processor for demodulation. The mobile communication module 950 may further amplify a signal modulated by the modem processor, and convert the signal into an electromagnetic wave by using the antenna 1 for radiation. In some embodiments, at least some of functional modules of the mobile communication module 950 may be arranged in the processor 910. In some embodiments, at least some of the functional modules of the mobile communication module 950 and at least some modules of the processor 910 may be arranged in a same component.

The modem processor may include a modulator and a demodulator. The modulator is configured to modulate a to-be-sent low-frequency baseband signal into a middle/high-frequency signal. The demodulator is configured to demodulate the received electromagnetic wave signal into a low-frequency baseband signal. Then the demodulator transfers the low-frequency baseband signal obtained through demodulation to the baseband processor for processing. The low-frequency baseband signal is processed by the baseband processor and then transferred to an application processor. The application processor outputs a sound signal through an audio device (which is not limited to the speaker 970A, the phone receiver 970B, and the like), or displays an image or a video through the display screen 994. In some embodiments, the modem processor may be an independent component. In some other embodiments, the modem processor may be independent of the processor 910, and the modem processor and the mobile communication module 950 or another functional module may be arranged in a same component.

The wireless communication module 960 may provide a solution to wireless communication applied to the electronic device 900, for example, a WLAN (for example, a Wi-Fi), BT, a global navigation satellite system (global navigation satellite system, GNSS), FM, NFC, IR, or a general 2.4G/5G wireless communication technology. The wireless communication module 960 may be one or more components that integrate at least one communication processing module. The wireless communication module 960 receives an electromagnetic wave by using the antenna 2, performs frequency modulation and filtering processing on an electromagnetic wave signal, and sends a processed signal to the processor 910. The wireless communication module 960 may alternatively receive a to-be-sent signal from the processor 910, perform frequency modulation and amplification on the to-be-sent signal, and convert the to-be-sent signal into an electromagnetic wave for radiation through the antenna 2.

In some embodiments, the wireless communication module 960 may be a Wi-Fi and/or a Bluetooth chip. The electronic device 900 may establish a connection to a chip of an electronic device such as a wireless headset through the chip, to implement wireless communication and service processing between the electronic device 900 and another electronic device through the connection. Generally, the Bluetooth chip may support BR/EDR Bluetooth and BLE.

In some embodiments, in the electronic device 900, the antenna 1 is coupled to the mobile communication module 950, and the antenna 2 is coupled to the wireless communication module 960, so that the electronic device 900 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TDSCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a beidou navigation satellite system (beidou navigation satellite system, BDS), a quasi-zenith satellite system (quasi-zenith satellite system, QZSS), and/or satellite-based augmentation systems (satellite based augmentation systems, SBAS).

The electronic device 900 implements a display function by using the GPU, the display screen 994, the application processor, and the like. The GPU is a microprocessor for image processing, and is connected to the display screen 994 and the application processor. The GPU is configured to perform mathematical and geometric calculations and perform graphics rendering. The processor 910 may include one or more GPUs, and execute program instructions to generate or change display information.

The display screen 994 is configured to display an image, a video, and the like. The display screen 994 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flex light-emitting diode (flex light-emitting diode, FLED), a Miniled, a MicroLed, a Micro-oLed, quantum dot light emitting diodes (quantum dot light emitting diodes, QLED), or the like. In some embodiments, the electronic device 900 may include 1 or N display screens 994. N is a positive integer greater than 1.

The electronic device 900 can implement a photographing function by using the ISP, the camera 993, the video codec, the GPU, the display screen 994, the application processor, and the like.

The ISP is configured to process data fed back by the camera 993. For example, during photographing, a shutter is opened, light is transferred to a camera photosensitive element by using a lens, an optical signal is converted into an electrical signal, and the camera photosensitive element transfers the electrical signal to the ISP for processing, to convert the electrical signal into an image visible to a naked eye. The ISP may further perform algorithm optimization on noise, brightness, and complexion of the image. The ISP may further optimize parameters such as exposure and a color temperature of a shooting scene. In some embodiments, the ISP may be arranged in the camera 993.

The camera 993 is configured to capture a static image or a video. An optical image is generated for an object by using the lens and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transfers the electrical signal to the ISP, to convert the electrical signal into a digital image signal. The ISP outputs the digital image signal to the DSP for processing. The DSP converts the digital image signal into a standard format such as RGB or YUV. In some embodiments, the electronic device 900 may include 1 or N cameras 993, and N is a positive integer greater than 1.

The DSP is configured to process a digital signal, and may further process another digital signal in addition to a digital image signal. For example, when the electronic device 900 performs frequency selection, the digital signal processor is configured to perform Fourier transform and the like on frequency energy.

The video codec is configured to compress or decompress a digital video. The electronic device 900 may support one or more video codecs. In this way, the electronic device 900 may play or record videos in a plurality of encoding formats, for example, moving picture experts group (moving picture experts group, MPEG) 1, MPEG 2, MPEG 3, MPEG 4, or the like.

The NPU is a neural-network (neural-network, NN) computing processor that processes input information rapidly by referring to a structure of a biological neural network, for example, by referring to a transmission mode between human brain neurons, and can further perform self-learning continuously. The NPU may be used to implement an application such as intelligent cognition of the electronic device 900, for example, image recognition, facial recognition, voice recognition, and text understanding.

The external memory interface 920 may be configured to connect to an external storage card, for example, a micro SD card, to expand a storage capability of the electronic device 900. The external storage card communicates with the processor 910 by using the external memory interface 920, to implement a data storage function, for example, storing files such as music and a video into the external storage card.

The internal memory 921 may be configured to store computer executable program code, where the executable program code includes an instruction. The processor 910 runs the instruction stored in the internal memory 921, to perform various functional applications of the electronic device 900 and perform data processing. The internal memory 921 may include a program storage region and a data storage region. The program storage region may store an operating system, an application required by at least one function (such as a voice playing function or an image playing function), and the like. The data storage region may store data (for example, audio data and an address book) and the like created during use of the electronic device 900. In addition, the internal memory 921 may include a high-speed random access memory, and may further include a non-volatile memory such as at least one magnetic disk memory, a flash memory, or a universal flash storage (universal flash storage, UFS).

The processor 910 may be configured to execute the foregoing program code, and invoke related modules to implement the functions of the electronic device in this embodiment of this application, for example, establish a plurality of communication links to another electronic device, and transmit, in a case that there is a preset service (for example, a file transmission service), data of the preset service to another electronic device through the plurality of communication links.

The electronic device 900 may implement an audio function by using the speaker 970A, the phone receiver 970B, the microphone 970C, the headset jack 970D, the application processor, and the like in the audio module 970, for example, music playing or sound recording.

The audio module 970 is configured to convert digital audio information into an analog audio signal output, and is further configured to convert an analog audio input into a digital audio signal. The audio module 970 may further be configured to encode and decode an audio signal. In some embodiments, the audio module 970 may be arranged in the processor 910, or some functional modules of the audio module 970 may be arranged in the processor 910.

The speaker 970A, also referred to as a "horn", is configured to convert an audio electrical signal into a sound signal. Music can be listened to or a hands-free call can be answered by using the speaker 970A in the electronic device 900.

The phone receiver 970B, also referred to as a "handset", is configured to convert an audio electrical signal into a sound signal. When the electronic device 900 is configured to answer a call or receive voice information, the phone receiver 970B may be put close to a human ear to receive a voice.

The microphone 970C, also referred to as a "mouthpiece", is configured to convert a sound signal into an electrical signal. When making a call or sending voice information, a user may make a sound near the microphone 970C through the mouth of the user, to input a sound signal into the microphone 970C. At least one microphone 970C may be arranged in the electronic device 900. In some other embodiments, two microphones 970C may be arranged in the electronic device 900, to acquire a sound signal and implement a noise reduction function. In some other embodiments, three, four, or more microphones 970C may be alternatively arranged in the electronic device 900, to acquire a sound signal, implement noise reduction, recognize a sound source, implement a directional recording function, and the like.

The headset jack 970D is configured to be connected to a wired headset. The headset jack 970D may be a USB interface 930, or may be a 3.5 mm open mobile terminal platform (open mobile terminal platform, OMTP) standard interface, or a cellular telecommunications industry association of the USA (cellular telecommunications industry association of the USA, CTIA) standard interface.

The pressure sensor 980A is configured to sense a pressure signal, and can convert the pressure signal into an electrical signal. In some embodiments, the pressure sensor 980A may be arranged in the display screen 994. There are many types of pressure sensors 980A, for example, a resistive pressure sensor, an inductive pressure sensor, and a capacitive pressure sensor. The capacitive pressure sensor may include at least two parallel plates made of conductive materials. In a case that a force is applied onto the pressure sensor 980A, capacitance between electrodes changes. The electronic device 900 determines pressure strength based on a change in the capacitance. In a case that a touch operation is performed on the display screen 994, the electronic device 900 detects strength of the touch operation by using the pressure sensor 980A. The electronic device 900 may also calculate a touch position based on a detection signal of the pressure sensor 980A. In some embodiments, touch operations that are applied to a same touch position but have different touch operation strength may correspond to different operation instructions. For example, in a case that a touch operation whose touch operation strength is less than a first pressure threshold is performed on an icon of an SMS message application, an instruction for viewing an SMS message is performed. In a case that a touch operation whose touch operation strength is greater than or equal to the first pressure threshold is performed on the icon of the SMS message application, an instruction for creating a new SMS message is performed.

The gyroscope sensor 980B may be configured to determine a motion posture of the electronic device 900. In some embodiments, an angular velocity of the electronic device 900 around three axes (for example, x, y, and z axes) may be determined through the gyroscope sensor 980B. The gyroscope sensor 980B may be configured for image stabilization during photographing. Exemplarily, in a case that the shutter is pressed, the gyroscope sensor 980B detects an angle at which the electronic device 900 jitters, and calculates, based on the angle, a distance for which a lens module needs to compensate, and allows the lens to offset the jitter of the electronic device 900 through reverse motion, thereby implementing image stabilization. The gyroscope sensor 980B may further be configured for navigation and a motion sensing game scene.

The acceleration sensor 980E may detect acceleration values of the electronic device 900 in all directions (generally in directions of three axes). In a case that the electronic device 900 is stationary, a magnitude and a direction of a gravity may be detected. The acceleration sensor may be further configured to recognize a posture of the electronic device, and is applied to applications such as switching between landscape and portrait modes and a pedometer.

The distance sensor 980F is configured to measure a distance. The electronic device 900 may measure a distance through infrared light or laser. In some embodiments, in a shooting scene, the electronic device 900 may measure a distance by using the distance sensor 980F, to achieve quick focusing.

The optical proximity sensor 980G may include, for example, a light-emitting diode (light-emitting diode, LED) and an optical detector such as a photodiode. The light-emitting diode may be an infrared light-emitting diode. The electronic device 900 emits infrared light by using the light-emitting diode. The electronic device 900 detects infrared reflected light from a nearby object by using the photodiode. In a case that sufficient reflected light is detected, it may be determined that there is an object near the electronic device 900. In a case that insufficient reflected light is detected, the electronic device 900 may determine that there is no object near the electronic device 900. The electronic device 900 may detect, by using the optical proximity sensor 980G, that a user holds the electronic device 900 close to an ear for a call, so as to implement automatic screen-off to save power. The optical proximity sensor 980G may alternatively be used in a leather case mode or a pocket mode to automatically unlock or lock the screen.

The ambient light sensor 980K is configured to sense brightness of ambient light. The electronic device 900 may adaptively adjust brightness of the display screen 994 according to the perceived brightness of the ambient light. The ambient light sensor 980K may be further configured to automatically adjust white balance during photographing. The ambient light sensor 980K may also cooperate with the optical proximity sensor 980G to detect whether the electronic device 900 is in a pocket, so as to prevent an accidental touch.

The barometric pressure sensor 980C is configured to measure barometric pressure. In some embodiments, the electronic device 900 calculates an altitude by using a barometric pressure value measured by the barometric pressure sensor 980C, to assist in positioning and navigation.

The magnetic sensor 980D includes a Hall sensor. The electronic device 900 may detect displacement of the electronic device 900 by using the magnetic sensor 980D. In some embodiments, the Hall sensor may form a linear trapezoidal magnetic field (or referred to as a ramp magnetic field) by using a magnet. A change of a Hall piece in displacement in the linear magnetic field is consistent with a change in magnetic field strength, and therefore, a formed Hall potential is proportional to the displacement. In this case, the electronic device 900 can measure the displacement by acquiring the Hall potential.

The fingerprint sensor 980H is configured to collect a fingerprint. The electronic device 900 may use a feature of the collected fingerprint to implement fingerprint-based unlocking, application lock access, fingerprint-based photographing, fingerprint-based call answering, and the like.

The temperature sensor 980I is configured to detect a temperature. In some embodiments, the electronic device 900 executes a temperature processing policy by using the temperature detected by the temperature sensor 980I. For example, in a case that the temperature reported by the temperature sensor 980I exceeds a threshold, the electronic device 900 lowers performance of a processor located near the temperature sensor 980I, to reduce power consumption and implement thermal protection. In some other embodiments, in a case that the temperature is lower than another threshold, the electronic device 900 heats the battery 942, to avoid an abnormal shutdown of the electronic device 900 caused by a low temperature. In some other embodiments, in a case that the temperature is below still another threshold, the electronic device 900 boosts an output voltage of the battery 942 to prevent an abnormal shutdown caused by the low temperature.

The touch sensor 980J is also referred to as a "touch panel". The touch sensor 980J may be arranged on the display screen 994. The touch sensor 980J and the display screen 994 form a touchscreen, which is also referred to as a "touch screen". The touch sensor 980J is configured to detect a touch operation performed on or near the touch sensor. The touch sensor may transfer the detected touch operation to the application processor to determine a type of a touch event. A visual output related to the touch operation may be provided through the display screen 994. In some other embodiments, the touch sensor 980J may alternatively be arranged on a surface of the electronic device 900 at a position different from that of the display screen 994.

The bone conduction sensor 980L may acquire a vibration signal. In some embodiments, the bone conduction sensor 980L may acquire a vibration signal of a vibration bone of a human vocal-cord part. The bone conduction sensor 980L may also come into contact with a human pulse to receive a blood pressure beating signal. In some embodiments, the bone conduction sensor 980L may alternatively be arranged in the headset to form a bone conduction headset. The audio module 970 may parse out a voice signal based on the vibration signal of the vibration bone of the vocal-cord part that is acquired by the bone conduction sensor 980L, to implement a voice function. The application processor may parse heart rate information based on the blood pressure beating signal acquired by the bone conduction sensor 980L, to implement a heart rate detection function.

The key 990 includes a power key, a volume key, and the like. The key 990 may be a mechanical key, or may be a touch-type key. The electronic device 900 may receive a key input, and generate a key signal input related to user setting and function control of the electronic device 900.

The motor 991 may generate a vibration prompt. The motor 991 may be configured to provide a vibration prompt for an incoming call, and may be further configured to provide a touch vibration feedback. For example, touch operations performed on different applications (for example, photographing and audio playing) may correspond to different vibration feedback effects. For touch operations performed on different regions of the display screen 994, the motor 991 may also correspond to different vibration feedback effects. Different application scenes (for example, a time prompt, information receiving, an alarm clock, and a game) may also correspond to different vibration feedback effects. Customization of a touch vibration feedback effect may also be supported.

The indicator 992 may be an indicator light, may be configured to indicate a charging state and a battery change, and may be further configured to indicate a message, a missed call, a notification, and the like.

The SIM card interface 995 is configured to connect to a SIM card. The SIM card may be inserted into the SIM card interface 995 or plugged from the SIM card interface 995, to come into contact with or be separated from the electronic device 900. The electronic device 900 may support one or N SIM card interfaces, where N is a positive integer greater than 1. The SIM card interface 995 may support a Nano SIM card, a Micro SIM card, a SIM card, and the like. A plurality of cards may be inserted into a same SIM card interface 995 together. The plurality of cards may be of a same type or different types. The SIM card interface 995 may be further compatible with different types of SIM cards. The SIM card interface 995 may also be compatible with an external memory card. The electronic device 900 interacts with a network by using a SIM card, to implement functions such as a call and data communication. In some embodiments, the electronic device 900 uses an eSIM, that is, an embedded SIM card. The eSIM card may be embedded in the electronic device 900 and cannot be separated from the electronic device 900.

The electronic device 900 may be a mobile terminal, or may be a non-mobile terminal. Exemplarily, the electronic device 900 may be a mobile phone, a tablet computer, a notebook computer, a palmtop computer, an in-vehicle terminal, a wearable device, an ultra-mobile personal computer (ultra-mobile personal computer, UMPC), a netbook, a personal digital assistant (personal digital assistant, PDA), a wireless headset, a wireless bracelet, a pair of wireless smart glasses, a wireless watch, an augmented reality (augmented reality, AR)\virtual reality (virtual reality, VR) device, a desktop computer, a smart household appliance (for example, a TV, a speaker, a refrigerator, an air purifier, an air conditioner, a rice cooker), or the like. The electronic device 900 may also be collectively referred to as an Internet of Things (Internet of Things, IoT) device. A device type of the electronic device 900 is not specifically limited in this embodiment of this application.

It should be understood that the electronic device 900 shown in FIG. 11 may correspond to the apparatus 800 shown in FIG. 10. The processor 910, the display screen 994, and the sensor module 980 in the electronic device 900 shown in FIG. 11 may respectively correspond to the processing unit 830, the display unit 810, and the acquisition unit 820 in the apparatus 800 in FIG. 10.

During actual implementation, in a case that the electronic device 900 is run, the processor 910 executes computer-executable instructions in the memory 921, to perform the operation steps of the foregoing method through the electronic device 900.

Optionally, in some embodiments, this application provides a chip. The chip is coupled to a memory, and is configured to read and execute a computer program or instructions stored in the memory to perform the method in the foregoing embodiments.

Optionally, in some embodiments, this application provides an electronic device, including a chip. The chip is configured to read and execute a computer program or instructions stored in the memory, to cause the method in the embodiments to be performed.

Optionally, in some embodiments, the embodiments of this application further provide a computer-readable medium, storing program code, the computer program code, when run on a computer, causing the computer to perform the method according to the foregoing aspects.

Optionally, in some embodiments, the embodiments of this application further provide a computer program product, including computer program code, the computer program code, when run on a computer, causing the computer to perform the method according to the foregoing aspects.

In the embodiments of this application, the electronic device includes a hardware layer, an operating system layer running on the hardware layer, and an application layer running on the operating system layer. The hardware layer may include hardware such as a central processing unit (central processing unit, CPU), a memory management unit (memory management unit, MMU), and a memory (which is also referred to as a main memory). The operating system of the operating system layer may be any one or more computer operating systems such as a Linux operating system, a Unix operating system, an Android operating system, an iOS operating system, or a Windows operating system that implement service processing by using a process (process). The application layer includes an application such as a browser, an address book, word processing software, or instant messaging software.

The embodiments of this application do not specifically limit a specific structure of an execution entity of the method provided in the embodiments of this application, as long as the program in which the code of the method provided in the embodiments of this application is recorded can be executed for communication according to the embodiments of this application. For example, the execution entity of the method provided in the embodiments of this application may be an electronic device, or may be a functional module in the electronic device that can invoke a program and execute the program.

Aspects or features of this application may be implemented as a method, an apparatus, or a product that uses standard programming and/or engineering technologies. The term "product" used in this specification may cover a computer program that can be accessed from any computer readable component, carrier or medium. For example, the computer-readable medium may include but is not limited to: a magnetic storage component (such as a hard disk, a floppy disk, or a magnetic tape), an optical disc (for example, a compact disc (compact disc, CD), or a digital versatile disc (digital versatile disc, DVD)), a smart card, and a flash memory component (such as an erasable programmable read-only memory (erasable programmable read-only memory, EPROM), a card, a stick, or a key drive).

Various storage media described in this specification may indicate one or more devices and/or other machine-readable media that is used to store information. The term "machine readable media" may include but is not limited to a radio channel, and various other media that can store, contain and/or carry an instruction and/or data.

It should be understood that, the processor described in the embodiments of this application may be a central processing unit (central processing unit, CPU), another general-purpose processor, a digital signal processor (digital signal processor, DSP), an application specific integrated circuit (application specific integrated circuit, ASIC), a field programmable gate array (field programmable gate array, FPGA), another programmable logic device, a discrete gate, a transistor logic device, a discrete hardware component, or the like. The general-purpose processor may be a microprocessor, or the processor may be any conventional processor or the like.

It should be further understood that the memory described in the embodiments of this application may be a volatile memory or a non-volatile memory, or may include a volatile memory and a non-volatile memory. The non-volatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM). For example, the RAM may be used as an external cache. As an example rather than a limitation, the RAM may include the following various forms: a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

It should be noted that in a case that the processor is a general-purpose processor, a DSP, an ASIC, an FPGA, another programmable logic component, a discrete gate, a transistor logic device, or a discrete hardware component, the memory (a storage module) may be integrated into the processor.

It should be further noted that the memory described herein is intended to include but not limited to these memories and memories of any other suitable types.

A person of ordinary skill in the art may be aware that the units and steps in the examples described with reference to the embodiments disclosed in this specification can be implemented by electronic hardware or a combination of computer software and electronic hardware. Whether the functions are executed by hardware or software depends on particular applications and design constraint conditions of the technical solutions. A person skilled in the art may use different methods to implement the described functions for each particular application, but it should not be considered that the implementation goes beyond the protection scope of this application.

It may be clearly understood by a person skilled in the art that, for convenience and conciseness of description, for detailed working processes of the foregoing system, apparatus, and units, reference may be made to corresponding processes in the foregoing method embodiments, and details are not described herein again.

In the several embodiments provided in this application, it should be understood that the disclosed system, apparatus, and method may be implemented in other manners. For example, the described apparatus embodiment is merely exemplary. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate components may or may not be physically separated, and the components displayed as units may or may not be physical units, and may be located in one place or may be distributed on a plurality of network units. Some or all of the units may be selected according to actual requirements to achieve the objectives of the solutions of the embodiments.

In addition, functional units in the embodiments of this application may be integrated into one processing unit, or each of the units may be physically separated, or two or more units may be integrated into one unit.

In a case that the function is implemented in the form of a software functional unit and sold or used as an independent product, the function may be stored in a computer-readable storage medium. Based on such an understanding, the technical solutions of this application essentially, or the part contributing to the prior art, or some of the technical solutions may be implemented in a form of a computer software product. The computer software product is stored in a storage medium, and includes several instructions for instructing a computer device (which may be a personal computer, a server, a network device, or the like) to perform all or some of the steps of the methods described in the embodiments of this application. The storage medium may include but is not limited to: various media that may store processing code, such as a USB flash drive, a removable hard disk, a ROM, a RAM, a magnetic disk, and an optical disc.

Unless otherwise defined, meanings of all technical and scientific terms used in this specification are the same as those usually understood by a person skilled in the art to which this application belongs. In this application, terms used in the specification of this application are merely intended to describe objectives of specific embodiments, but are not intended to limit this application.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An always on display control method, comprising:
    displaying, by an electronic device, a screen-off image in a case that the electronic device is in a screen-off state, wherein the screen-off image comprises a plurality of layers, and the plurality of layers comprise different display elements; and
    updating and displaying, by the electronic device, a display element on a first layer in the screen-off image in a case that the electronic device meets a preset condition, wherein the display element on the first layer comprises a foreground window, and the preset condition comprises that: the electronic device detects that user positioning information changes, or the electronic device receives a first operation performed by a user on the screen-off image; or updating and displaying, by the electronic device, a display element on a second layer in the screen-off image in a case that the electronic device detects that user behavior information changes, wherein the display element on the second layer comprises a scene pattern; or updating and displaying, by the electronic device, a display element on a third layer in the screen-off image in a case that the electronic device detects that time and meteorological information changes, wherein the display element on the third layer comprises a background pattern, wherein before the updating and displaying, by the electronic device, a display element on a second layer in the screen-off image, the method further comprises:

determining, by the electronic device, a scene pattern corresponding to the user behavior information according to the user behavior information and a second preset relationship, wherein the second preset relationship is a preset correspondence between the user behavior information and a scene pattern with specific content.

2. The method according to claim 1, wherein the user positioning information comprises: at home, in a company, or on a trip;

the user behavior information comprises: an entertainment state, a learning state, or a sports state; and the time and meteorological information comprises: a time in the morning/at noon/in the evening, a season, or weather.

3. The method according to claim 1, further comprising:

further displaying, by the electronic device, at least one of a time, a date, a notification message, an incoming call reminder message, and a power identifier in a case that the electronic device is in the screen-off state.

4. The method according to claim 1, wherein the displaying, by an electronic device, a screen-off image comprises:

superimposing and displaying, by the electronic device, the plurality of layers in the screen-off image in a preset layer superposition sequence.

5. The method according to claim 4, further comprising:

updating, by the electronic device, the layer superposition sequence in response to a second operation by the user; or periodically updating, by the electronic device, the layer superposition sequence.

6. The method according to claim 1, wherein the updating and displaying, by the electronic device, a display element on a first layer in the screen-off image in a case that the electronic device meets a first preset condition, wherein the display element on the first layer comprises a foreground window comprises:

switching, by the electronic device, the foreground window on the first layer in the screen-off image from an off state to an on state in response to the first operation performed by the user on the screen-off image; or switching, by the electronic device, the foreground window on the first layer in the screen-off image from an on state to an off state in response to the first operation performed by the user on the screen-off image; or displaying, by the electronic device, a louver effect on the foreground window on the first layer in the screen-off image in response to the first operation performed by the user on the screen-off image.

7. The method according to claim 6, further comprising:

updating and displaying, by the electronic device, the scene pattern on the second layer in a case that the foreground window on the first layer in the screen-off image is switched from the off state to the on state.

8. The method according to claim 1, wherein before the updating and displaying, by the electronic device, a display element on a first layer in the screen-off image, the method further comprises:

determining, by the electronic device, a foreground window corresponding to the user positioning information according to the user positioning information and a first preset relationship, wherein the first preset relationship is a preset correspondence between the user positioning information and a foreground window in a specific shape or size.

9. The method according to claim 1, further comprising:

determining, by the electronic device according to an application that is running on the electronic device, behavior information that the user acts on the electronic device as the user behavior information.

10. The method according to claim 9, wherein the determining, by the electronic device according to an application that is running on the electronic device, behavior information that the user acts on the electronic device as the user behavior information comprises:

acquiring, by the electronic device, user sports data according to the application that is running on the electronic device; and determining, by the electronic device, that the user behavior information comprises a sports state in a case that the electronic device determines that the user sports data meets a preset sports condition, wherein the user sports data comprises a heart rate value of the user or a quantity of steps of the user within a preset duration.

11. The method according to claim 1, wherein before the updating and displaying, by the electronic device, a display element on a third layer in the screen-off image, the method further comprises:

determining, by the electronic device, a background pattern corresponding to the time and meteorological information according to the time and meteorological information and a third preset relationship, wherein the third preset relationship is a preset correspondence between the time and meteorological information and a background pattern with a specific pattern, color or specific brightness.

12. The method according to claim 1, wherein the displaying, by an electronic device, a screen-off image comprises:

displaying, by the electronic device, the screen-off image in a first always on display mode, wherein the first always on display mode comprises any of the following: a tap to display mode, a timing display mode, or an all-day display mode.

13. The method according to claim 12, further comprising:

setting, by the electronic device, an always on display mode to be the first always on display mode in response to a third operation by the user.

14. The method according to claim 1, wherein before the displaying, by an electronic device, a screen-off image in a case that the electronic device is in a screen-off state, the method further comprises:

enabling, by the electronic device, an always on display function in response to a fourth operation by the user.

15. The method according to claim 1, further comprising:
displaying, by the electronic device, a setting interface of the always on display function in response to a fifth operation by the user, wherein the setting interface comprises a preset gallery; and
using, by the electronic device in response to a sixth operation of selecting an image from the preset gallery by the user, the selected image as a display element on a target layer in the screen-off image, wherein
the preset gallery comprises an image stored locally in the electronic device or an image stored in a network server.

16. An electronic device comprising:
a processor,
and a memory;
wherein the processor is coupled to the memory, the memory is configured to store a computer program or instructions, and the processor is configured to execute the computer program or instructions stored in the memory, to cause the electronic device to implement:
displaying a screen-off image in a case that the electronic device is in a screen-off state, wherein the screen-off image comprises a plurality of layers, and the plurality of layers comprise different display elements; and
updating and displaying a display element on a first layer in the screen-off image in a case that the electronic device meets a preset condition, wherein the display element on the first layer comprises a foreground window, and the preset condition comprises that: the electronic device detects that user positioning information changes, or the electronic device receives a first operation performed by a user on the screen-off image; or
updating and displaying a display element on a second layer in the screen-off image in a case that the electronic device detects that user behavior information changes, wherein the display element on the second layer comprises a scene pattern; or
updating and displaying a display element on a third layer in the screen-off image in a case that the electronic device detects that time and meteorological information changes, wherein the display element on the third layer comprises a background pattern,
wherein before the updating and displaying a display element on a second layer in the screen-off image, the processor is configured to execute the computer program or instructions stored in the memory, to further cause the electronic device to implement:
determining a scene pattern corresponding to the user behavior information according to the user behavior information and a second preset relationship, wherein the second preset relationship is a preset correspondence between the user behavior information and a scene pattern with specific content.

17. A non-transitory computer-readable storage medium, storing a computer program, wherein the computer program, when run on an electronic device, causes the electronic device to perform:
displaying a screen-off image in a case that the electronic device is in a screen-off state, wherein the screen-off image comprises a plurality of layers, and the plurality of layers comprise different display elements; and
updating and displaying a display element on a first layer in the screen-off image in a case that the electronic device meets a preset condition, wherein the display element on the first layer comprises a foreground window, and the preset condition comprises that: the electronic device detects that user positioning information changes, or the electronic device receives a first operation performed by a user on the screen-off image; or
updating and displaying a display element on a second layer in the screen-off image in a case that the electronic device detects that user behavior information changes, wherein the display element on the second layer comprises a scene pattern; or
updating and displaying a display element on a third layer in the screen-off image in a case that the electronic device detects that time and meteorological information changes, wherein the display element on the third layer comprises a background pattern,
wherein before the updating and displaying a display element on a second layer in the screen-off image, the computer program, when run on the electronic device, further causes the electronic device to perform:
determining a scene pattern corresponding to the user behavior information according to the user behavior information and a second preset relationship, wherein the second preset relationship is a preset correspondence between the user behavior information and a scene pattern with specific content.

\* \* \* \* \*